United States Patent
Cholas et al.

(10) Patent No.: US 9,342,661 B2
(45) Date of Patent: May 17, 2016

(54) APPARATUS AND METHODS FOR RIGHTS-MANAGED CONTENT AND DATA DELIVERY

(75) Inventors: Chris Cholas, Frederick, CO (US);
Jeffrey P. Markley, Superior, CO (US);
Vipul Patel, Upper Holland, PA (US);
Christopher Marsh, Reston, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 471 days.

(21) Appl. No.: 12/716,131

(22) Filed: Mar. 2, 2010

(65) Prior Publication Data
US 2011/0219229 A1    Sep. 8, 2011

(51) Int. Cl.
*G06F 21/00*    (2013.01)
*H04L 29/06*    (2006.01)
*H04L 9/32*    (2006.01)

(52) U.S. Cl.
CPC ....... *G06F 21/00* (2013.01); *H04L 9/32* (2013.01); *H04L 63/08* (2013.01); *H04L 63/20* (2013.01)

(58) Field of Classification Search
CPC ... H04L 9/32; H04L 2209/60; H04L 63/0428; H04L 63/08; H04L 63/20; H04L 9/0825; H04L 9/3263; G06F 21/00; G06F 21/10; G06F 2221/2137
USPC .............................. 713/150–181; 726/4, 7, 28
See application file for complete search history.

(56) References Cited

U.S. PATENT DOCUMENTS

| | | | |
|---|---|---|---|
| 5,528,284 A | 6/1996 | Iwami et al. | |
| 5,708,961 A | 1/1998 | Hylton et al. | |
| 5,818,438 A | 10/1998 | Howe et al. | |
| 6,167,432 A | 12/2000 | Jiang | |
| 6,181,697 B1 | 1/2001 | Nurenberg et al. | |
| 6,219,710 B1 | 4/2001 | Gray et al. | |
| 6,259,701 B1 | 7/2001 | Shur et al. | |
| 6,519,062 B1 | 2/2003 | Yoo | |

(Continued)

FOREIGN PATENT DOCUMENTS

WO    WO 01/10125    2/2001

OTHER PUBLICATIONS

DLNA (Digital Living Network Alliance) protocols described in DLNA Networked Device Interoperability Guidelines Expanded, Mar. 2006 and subsequent expanded version dated Oct. 2006.

*Primary Examiner* — Catherine Thiaw
*Assistant Examiner* — Don Zhao
(74) *Attorney, Agent, or Firm* — Gazdzinski & Associates, PC

(57) ABSTRACT

Methods and apparatus for providing access to content across a plurality of devices and environments. In one embodiment, a downloadable rights profile is utilized in order for a user device to determine whether to provide content to a subscriber. The user device is first registered to content delivery the network; the device then requests a rights profile indicating the rights of the subscriber associated with the device to access content. The rights profile is transmitted to the device. The rights profile may be configured to be valid only for a pre-determined time, thus enabling a subscriber's rights to be updated (including revoked). Security mechanisms may also be utilized to ensure access to content is limited only to authorized subscribers. In another embodiment, a user-based authentication procedure is utilized, thereby making the rights determination and content provision process completely agnostic to the underlying hardware.

17 Claims, 18 Drawing Sheets

(56) References Cited

U.S. PATENT DOCUMENTS

| | | |
|---|---|---|
| 6,523,696 B1 | 2/2003 | Saito |
| 6,640,145 B2 | 10/2003 | Hoffberg et al. |
| 6,694,145 B2 | 2/2004 | Riikonen et al. |
| 6,788,676 B2 | 9/2004 | Partanen et al. |
| 6,925,257 B2 | 8/2005 | Yoo |
| 6,944,150 B1 | 9/2005 | McConnell et al. |
| 7,003,670 B2* | 2/2006 | Heaven et al. ............... 713/186 |
| 7,006,881 B1 | 2/2006 | Hoffberg et al. |
| 7,009,972 B2 | 3/2006 | Maher et al. |
| 7,027,460 B2 | 4/2006 | Iyer et al. |
| 7,039,048 B1 | 5/2006 | Monta et al. |
| 7,054,902 B2 | 5/2006 | Toporek et al. |
| 7,068,639 B1 | 6/2006 | Varma et al. |
| 7,099,308 B2 | 8/2006 | Merrill et al. |
| 7,106,382 B2 | 9/2006 | Shiotsu |
| 7,149,772 B1 | 12/2006 | Kalavade |
| 7,174,127 B2 | 2/2007 | Otten et al. |
| 7,174,385 B2 | 2/2007 | Li |
| 7,209,458 B2 | 4/2007 | Ahvonen et al. |
| 7,242,960 B2 | 7/2007 | Van Rooyen |
| 7,254,608 B2 | 8/2007 | Yeager et al. |
| 7,325,073 B2 | 1/2008 | Shao et al. |
| 7,330,483 B1 | 2/2008 | Peters et al. |
| 7,376,386 B2 | 5/2008 | Phillips et al. |
| 7,486,869 B2 | 2/2009 | Alexander |
| 7,592,912 B2 | 9/2009 | Hasek |
| 7,690,020 B2 | 3/2010 | Lebar |
| 7,693,171 B2 | 4/2010 | Gould |
| 7,721,314 B2 | 5/2010 | Sincaglia |
| 7,742,074 B2 | 6/2010 | Minatogawa |
| 7,809,942 B2 | 10/2010 | Baran et al. |
| 7,954,131 B2 | 5/2011 | Cholas et al. |
| 2001/0004768 A1 | 6/2001 | Hodge et al. |
| 2002/0027883 A1 | 3/2002 | Belaiche |
| 2002/0032754 A1 | 3/2002 | Logston et al. |
| 2002/0056125 A1 | 5/2002 | Hodge et al. |
| 2002/0059619 A1 | 5/2002 | Lebar |
| 2002/0147771 A1 | 10/2002 | Traversat et al. |
| 2002/0152299 A1 | 10/2002 | Traversat et al. |
| 2002/0188744 A1 | 12/2002 | Mani |
| 2003/0048380 A1* | 3/2003 | Tamura ............... 348/552 |
| 2003/0056217 A1 | 3/2003 | Brooks |
| 2003/0066884 A1* | 4/2003 | Reddy et al. ............... 235/382.5 |
| 2003/0166401 A1 | 9/2003 | Combes et al. |
| 2003/0208767 A1 | 11/2003 | Williamson et al. |
| 2003/0217365 A1 | 11/2003 | Caputo |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0133923 A1 | 7/2004 | Watson et al. |
| 2004/0137918 A1 | 7/2004 | Varonen et al. |
| 2005/0034171 A1 | 2/2005 | Benya |
| 2005/0055220 A1 | 3/2005 | Lee et al. |
| 2005/0108763 A1 | 5/2005 | Baran et al. |
| 2005/0114900 A1 | 5/2005 | Ladd et al. |
| 2005/0177855 A1 | 8/2005 | Maynard et al. |
| 2005/0228725 A1* | 10/2005 | Rao et al. ............... 705/26 |
| 2005/0289618 A1 | 12/2005 | Hardin |
| 2006/0020786 A1* | 1/2006 | Helms et al. ............... 713/165 |
| 2006/0041905 A1* | 2/2006 | Wasilewski ............... 725/31 |
| 2006/0047957 A1* | 3/2006 | Helms et al. ............... 713/165 |
| 2006/0095940 A1 | 5/2006 | Yearwood |
| 2006/0130099 A1 | 6/2006 | Rooyen |
| 2006/0130107 A1 | 6/2006 | Gonder |
| 2006/0130113 A1 | 6/2006 | Carlucci et al. |
| 2006/0136964 A1 | 6/2006 | Diez et al. |
| 2006/0149850 A1 | 7/2006 | Bowman |
| 2006/0171423 A1 | 8/2006 | Helms et al. |
| 2006/0187900 A1 | 8/2006 | Akbar |
| 2006/0209799 A1 | 9/2006 | Gallagher et al. |
| 2006/0218604 A1 | 9/2006 | Riedl et al. |
| 2006/0248553 A1 | 11/2006 | Mikkelson et al. |
| 2006/0291506 A1 | 12/2006 | Cain |
| 2007/0019645 A1 | 1/2007 | Menon |
| 2007/0022459 A1 | 1/2007 | Gaebel et al. |
| 2007/0033531 A1 | 2/2007 | Marsh |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0094691 A1 | 4/2007 | Gazdzinski |
| 2007/0121678 A1 | 5/2007 | Brooks |
| 2007/0124488 A1 | 5/2007 | Baum et al. |
| 2007/0204314 A1 | 8/2007 | Hasek et al. |
| 2007/0209059 A1 | 9/2007 | Moore et al. |
| 2007/0217436 A1* | 9/2007 | Markley et al. ............... 370/401 |
| 2007/0219910 A1 | 9/2007 | Martinez |
| 2007/0245376 A1* | 10/2007 | Svendsen ............... 725/46 |
| 2007/0250880 A1 | 10/2007 | Hainline |
| 2007/0276926 A1 | 11/2007 | LaJoie |
| 2007/0288715 A1* | 12/2007 | Boswell et al. ............... 711/164 |
| 2008/0022012 A1 | 1/2008 | Wang |
| 2008/0066112 A1 | 3/2008 | Bailey et al. |
| 2008/0091805 A1 | 4/2008 | Malaby et al. |
| 2008/0098212 A1* | 4/2008 | Helms et al. ............... 713/155 |
| 2008/0112405 A1 | 5/2008 | Cholas et al. |
| 2008/0133551 A1 | 6/2008 | Wensley et al. |
| 2008/0148363 A1* | 6/2008 | Gilder et al. ............... 726/4 |
| 2008/0155059 A1 | 6/2008 | Hardin |
| 2008/0177998 A1* | 7/2008 | Apsangi et al. ............... 713/155 |
| 2008/0201386 A1* | 8/2008 | Maharajh et al. ............... 707/201 |
| 2008/0235746 A1 | 9/2008 | Peters |
| 2008/0256646 A1* | 10/2008 | Strom et al. ............... 726/29 |
| 2008/0273591 A1 | 11/2008 | Brooks |
| 2008/0279534 A1* | 11/2008 | Buttars ............... 386/94 |
| 2008/0282299 A1 | 11/2008 | Koat et al. |
| 2008/0320543 A1* | 12/2008 | Wang et al. ............... 725/131 |
| 2009/0006542 A1* | 1/2009 | Feldman et al. ............... 709/203 |
| 2009/0083813 A1 | 3/2009 | Dolce et al. |
| 2009/0100459 A1 | 4/2009 | Riedl |
| 2009/0100493 A1* | 4/2009 | Jones et al. ............... 725/131 |
| 2009/0185576 A1 | 7/2009 | Kisel et al. |
| 2009/0201917 A1 | 8/2009 | Maes et al. |
| 2009/0210912 A1 | 8/2009 | Cholas |
| 2009/0217036 A1* | 8/2009 | Irwin et al. ............... 713/168 |
| 2009/0225760 A1 | 9/2009 | Foti |
| 2009/0282241 A1* | 11/2009 | Prafullchandra et al. ...... 713/156 |
| 2010/0030578 A1 | 2/2010 | Siddique et al. |
| 2010/0083329 A1 | 4/2010 | Joyce et al. |
| 2010/0115113 A1* | 5/2010 | Short et al. ............... 709/228 |
| 2010/0131973 A1 | 5/2010 | Dillon |
| 2010/0146629 A1* | 6/2010 | Rahman et al. ............... 726/26 |
| 2010/0251305 A1 | 9/2010 | Kimble et al. |
| 2010/0287609 A1 | 11/2010 | Gonzalez et al. |
| 2010/0299264 A1* | 11/2010 | Berger et al. ............... 705/59 |
| 2010/0313225 A1 | 12/2010 | Cholas et al. |
| 2011/0055935 A1* | 3/2011 | Karaoguz et al. ............... 726/29 |
| 2011/0093900 A1 | 4/2011 | Patel et al. |
| 2011/0126018 A1* | 5/2011 | Narsinh et al. ............... 713/176 |
| 2011/0138064 A1 | 6/2011 | Rieger et al. |
| 2011/0138486 A1* | 6/2011 | White ............... 726/30 |

* cited by examiner

APPARATUS AND METHODS FOR RIGHTS-MANAGED CONTENT AND DATA DELIVERY

RELATED APPLICATIONS

This application is related to co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related in one exemplary aspect to apparatus and methods for distributing programming content, media, data and other information services via a rights-managed apparatus.

2. Description of Related Technology

Recent advances in digital information processing have made a whole range of services and functions available for delivery to consumers for very reasonable prices or subscription fees. These services and functions include digital programming (movies, etc.), digital video-on-demand (VOD), personal video recorder (PVR), Internet Protocol television (IPTV), digital media playback and recording, as well high-speed (broadband) internet access and IP-based telephony (e.g., VoIP).

Currently, many of these services are provided and delivered to the user via a wide variety of different equipment environments including, inter alia, cable modems, Wi-Fi hubs, Ethernet hubs, gateways, switches and routers, personal computers, laptop computers, servers, cable set-top boxes, PSTNs, cellular telephones/smartphones, PDAs, portable digital devices, miniature portable devices, etc. Additionally, the services associated with such technology are typically provided by multiple vendors including e.g., a cable service provider (e.g., MSO), cellular service provider (CSP), wireless service provider (WSP), VoIP service provider, music download service, Internet service provider (ISP), PSTN telephone service, etc.

The myriad of services, equipment and providers can easily create confusion and economic (and personal) inefficiency for someone using many of these services on a regular basis. In particular, a user may have to pay for each service or equipment separately, thus eliminating any economies of scale based on integration. For example, a cable network subscriber may have purchased access to certain content on his/her digital set top box (DSTB), but may not be able to view the same content on his or her personal computer from the Internet, or over their mobile phone or laptop.

Some improvements in digital service integration have been made over time. For example, cable system subscribers (such as those of the Assignee hereof) can now access VOD, PVR, PPV and broadcast (aka linear) services simultaneously, as well a Internet access via cable modem, and even digital telephony (e.g., VoIP). However, these functions are still substantially disparate in terms of their hardware and software environments (i.e., the user must have a cable modem, set-top box, VoIP telephony unit, PC, etc.), and "cross-over" between the environments (e.g., moving content or data from one environment to the other) can be quite limited.

Conditional access (CA) technologies are typically incorporated into content delivery networks, such technologies including the digital encoding of various types of data including audio and video programming and music. Conditional access can generally be defined as the control of when and how a user may view and use the associated programming or information. Different types of conditional access may be desirable in a network delivery system in order to, e.g., accommodate improvements in the technology over time, as well as different conditional access attributes such as security and category of programming or user access level.

A variety of traditional methods of conditional access exist including, e.g., "Powerkey", NDS, and DigiCipher. A generalized conditional access model is also provided by the well-known DVB (Digital Video Broadcasting) Specification TS 101 197 V1.2.1 (02/02), DVB SimulCrypt; Part 1: "Head-end architecture and synchronization", and TS 103 197 V1.2.1 (02/02): "Head-end Implementation of SimulCrypt", each incorporated herein by reference in its entirety. These can be implemented using, for example, the so-called "CableCard" plug-in security module access technology (also known as "a point-of-deployment (POD) module"). See, e.g., the Cable-Card-Host interface specification, which defines the interface between a digital cable receiver or STB (Host device) and the CableCard device provided by the MSO/cable operator. Specifically, the CableCard contains conditional access functionality, as well as the capability of converting messages to a common format. Thus, the CableCard provides a cable operator with a secure device at the subscriber premises, and acts as a translator so that the host device needs to understand a single protocol, regardless of the type of the network to which it is connected.

However, conditional access (CA) paradigms currently in use are quite restricted, and not generally extensible beyond the user's set-top box, thus only support provision of content to a user at a single device. So, for example, the user would be prohibited from accessing content via the cable modem (e.g., streamed or downloaded content to their Wi-Fi enabled laptop or PC) which he/she would otherwise be entitled to via a set-top-box, since proper conditional access support does not exist in these heterogeneous device environments.

Thus, improved apparatus and methods for providing content across multiple, often different platforms to a user are needed. Such improved apparatus and services would ideally provide users with a set of rights to content, the rights being accessible in any number of diverse devices, thereby simplifying user access to the services, and allowing for substantially "unrestricted" access across multiple platforms. For example, the user or subscriber would be provided with a media device wherein access to content, whether via an MSO or a third party (including for example an Internet host server), would be readily available to the subscriber, subject to any authentication or subscription restrictions. The improved apparatus and methods also advantageously exploit the concept that a particular content identification is tied to the user (as opposed to a device). Hence, a user may be given a domain of content and a domain of devices which may consume the given content.

SUMMARY OF THE INVENTION

The present invention addresses the foregoing needs by disclosing apparatus and methods for distributing programming, data, media and other information services via a rights-managed mechanism in a content delivery network.

In a first aspect of the invention, a computer readable apparatus having a storage medium containing at least one computer program is disclosed. In one embodiment, the program, when executed on a host device: accesses a rights profile associated with at least one of a user and/or the host device; determines, based on the accessing, the use rights that the user and/or host device has with respect to a first content element; and accesses, based at least in part on the use rights, the first content element for playback to a user of the host device.

In one variant, the access of a rights profile comprises: generating a request for the profile; transmitting the request to a network entity; and receiving from the network entity or its proxy, the profile. The received rights profile may be encrypted using e.g., a public/private key pair, and the host device possesses a private key of the pair that enables the program to decrypt the rights profile.

In another variant, the rights profile is generated by a network operator based at least in part on a subscription of the user to a service provided by the operator. The program further comprises a module for generating a user interface, the user interface allowing a user of a content delivery network to log into a network server so that the rights profile can be provided to the host device.

In a second aspect of the invention, consumer premises equipment (CPE) is disclosed. In one embodiment, the CPE is for use in a content delivery network, and comprises: a network interface adapted to: transmit a request for information regarding a subscriber's rights to content; receive the requested information; transmit a request for content; and receive the requested content; a storage apparatus adapted to store the information; and a digital processor adapted to determine, based at least in part on the information, whether the subscriber has a right to access the requested content, and if so providing the requested content to the user. The requested content is received irrespective of whether the subscriber has a right to access the requested content or not.

In a third aspect of the invention, a method for determining a set of rights for a subscriber to content in a content delivery network is disclosed. In one embodiment, the method comprises: receiving a request for the set of rights from the subscriber at a client device; associating the client device to the subscriber's account; determining the set of rights for the subscriber based at least in part on information obtained from the subscriber's account; and transmitting the set of rights to the subscriber at the client device.

In a fourth aspect of the invention, a method of determining a user's rights to access requested content at a client device is disclosed. In one embodiment, the method comprises: receiving a request for content; accessing a profile comprising the user's rights to access a plurality of content; and comparing information relating to the requested content to the profile. If the profile provides the user with a right to access the requested content, providing the requested content to the user; and if the profile fails to provide the user with the right to access the requested content, not providing the requested content to the user.

In a fifth aspect of the invention, a client device for use in a content delivery network is disclosed. In one embodiment, the client device comprises: a radio frequency (RF) front end interface; a plurality of back end interfaces; a storage apparatus; and a digital processor, the digital processor configured to run at least one computer program thereon. When executed, the program instructions: request information regarding a subscriber's rights to access a plurality of content via the RF front end interface; request one of the plurality of content from at least one content; determine based at least in part on the information whether the subscriber is given a right to access the requested one of the plurality of content; and if it is determined that the subscriber has the right, provide the subscriber with access to the requested one of the plurality of content.

In a fifth aspect of the invention, a method for providing content to individual ones of a plurality of client devices is disclosed. In one embodiment, the client devices are disposed within a content delivery network, and the method comprises: generating a plurality of profiles, each of the plurality of profiles comprising information regarding rights of one of a plurality of subscribers to access a plurality of content; sending individual ones of the plurality of profiles to respective ones of the individual ones of the plurality of client devices; sending the plurality of content to the individual ones of the plurality of client devices; and enabling the individual ones of the plurality of client devices to utilize the information contained in the individual ones of the plurality of profiles to determine whether to provide for display of individual ones of the plurality of content sent thereto.

In a sixth aspect of the invention, a content provisioning system is disclosed. In one embodiment, the content provisioning system is used in a content delivery network (e.g., satellite or cable delivery network), and is used to interface with a client device process to receive requests for access to content, and locate/generate user rights profiles for transmission to the client device.

These and other aspects of the invention shall become apparent when considered in light of the disclosure provided herein.

DETAILED DESCRIPTION OF THE INVENTION

Figure 1:
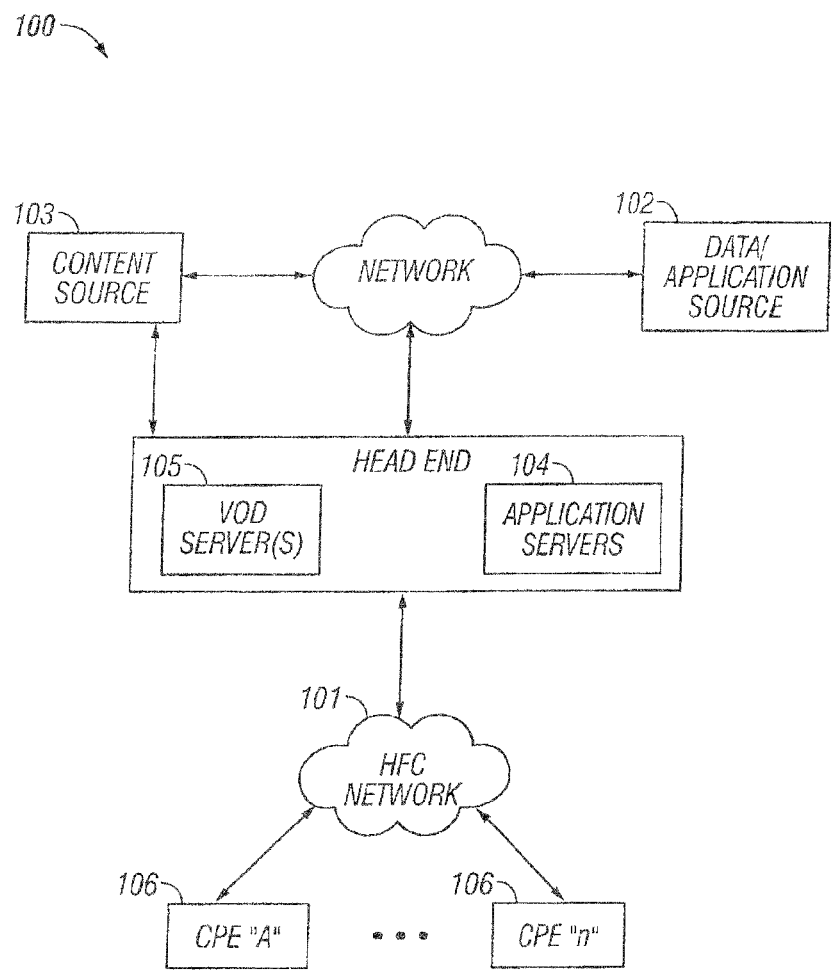
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is, adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11 a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention comprises in one salient aspect, methods and apparatus for providing access to content across a plurality of devices and environments by utilizing a downloadable or transferrable rights profile coupled with a "smart" media player application. The rights profile contains information regarding the specific rights of a device and/or a subscriber to access content. It is via the rights profile that the device (via the media player and its associated rights management application) determines whether to provide content to a subscriber. In one implementation, the rights profile is utilized by the media player to provide access to encoded content which would be otherwise inaccessible.

In one embodiment, a device is registered to a content delivery network (e.g., cable television or satellite network) which has both RF and IP delivery capability (e.g., via in-band and DOCSIS QAMs). The same device may then request a profile of the rights of the subscriber associated with the device from an entity of the network, such as by providing device and/or user specific information (such as MAC address, and/or user login or digital signature information). The device may for example be registered either directly at a billing or authorization entity of an MSO when a subscriber leases the device therefrom, or may be registered indirectly when the subscriber purchases or leases the device from a third party.

In response to the profile request, a profile specific to the subscriber and/or device is generated and transmitted for storage at the device. A first (authorized) device may also request and store a rights profile on behalf of a second device in communication therewith (e.g., a gateway may store a profile on behalf of a client device such as a DSTB or PC/laptop).

When a user subsequently requests access to content, the stored rights profile is consulted in order to determine whether such access should be provided. According to this embodiment, upon user request, content may be provided to the device and it is the device, and not the network, which determines whether content may be accessed (and which enables access).

In an alternative embodiment, the determination may be made at an entity associated with the network. According to this embodiment, requested content will not be sent to the device unless the rights of the subscriber indicate the content may be accessed by the device.

The rights profile may also be configured for conditional implementation; e.g., valid only for a pre-determined length of time, only for a predetermined number of plays, only on certain days, etc., thus enabling a subscriber's rights to be updated or vary as a function of time and/or other factors (including being revoked). Security and fraud prevention mechanisms may also be utilized consistent with the invention to ensure access to content is limited only to authorized subscribers (or that the content is not distributed outside designated authorized domains where so restricted).

In another implementation, the rights profile and content access are device agnostic; i.e., can be resident on literally any compatible device, with content access being purely user-based (e.g., based on the subscription status of the user, regardless of what platform they are requesting the content from).

In another embodiment, the gateway device translates the user and content rights that are received from an MSO or the content into a link protection, such as DTCP over IP.

Detailed Description of Exemplary Embodiments

Exemplary embodiments of the apparatus and methods of the present invention are now described in detail. While these exemplary embodiments are described in the context of the aforementioned hybrid fiber coax (HFC) cable system or satellite network architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460) and Session Initiation Protocol (SIP), it will be appreciated that the present invention may utilize other types of protocols (and in fact bearer networks to include other internets and intranets) to implement the described functionality.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Exemplary embodiments of the "rights-managed" CPE 106 of the invention are described subsequently herein with respect to FIG. 3.

Figure 1A:
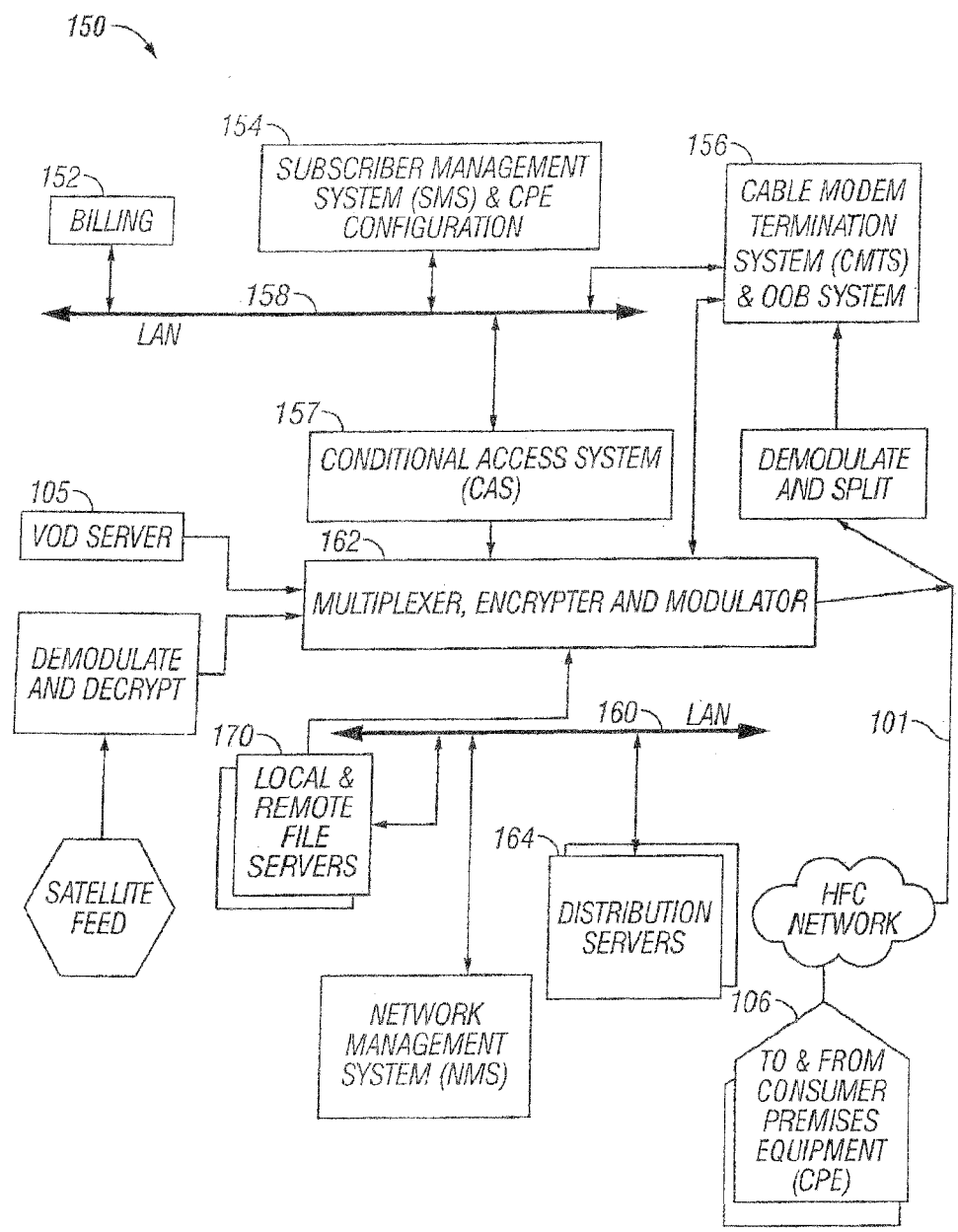
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
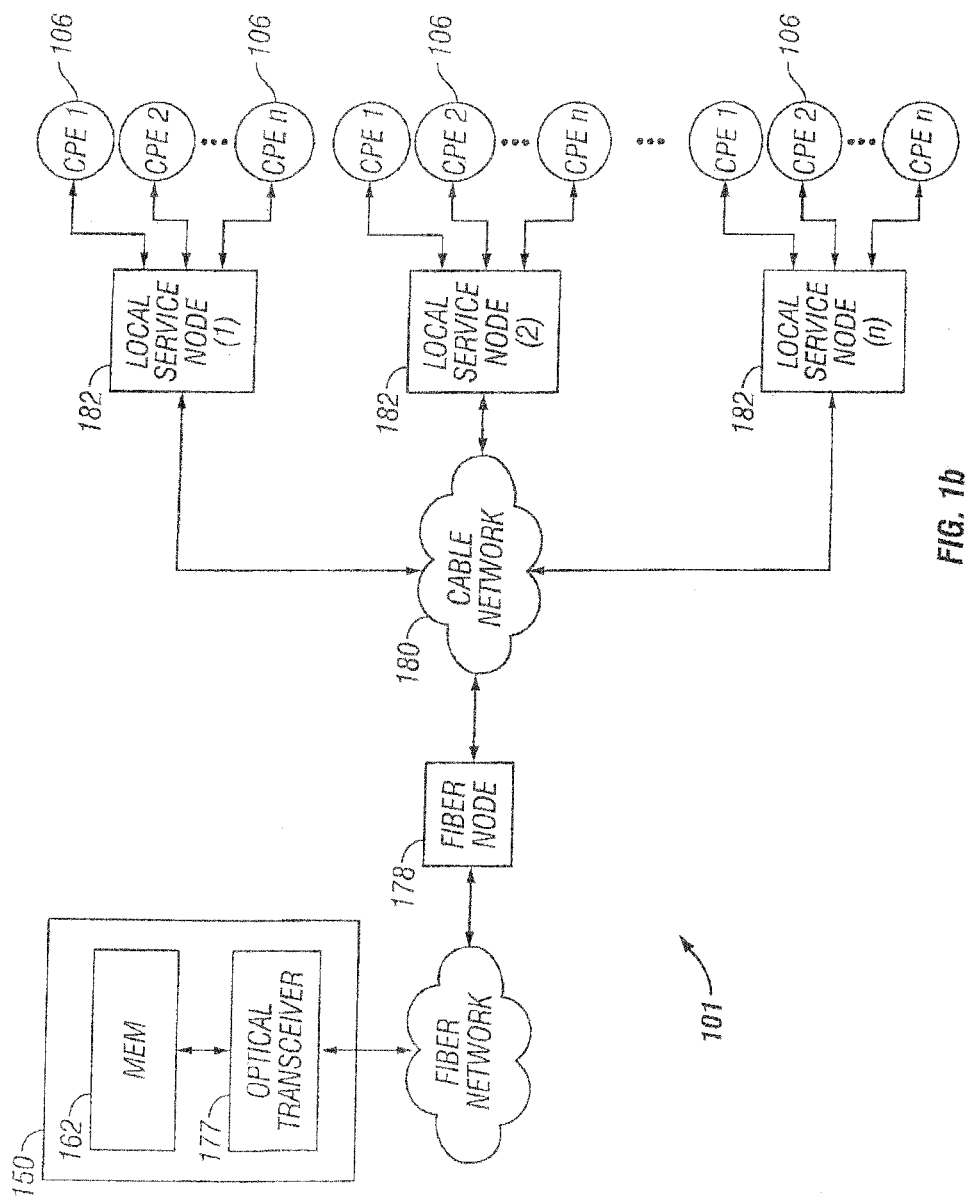
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
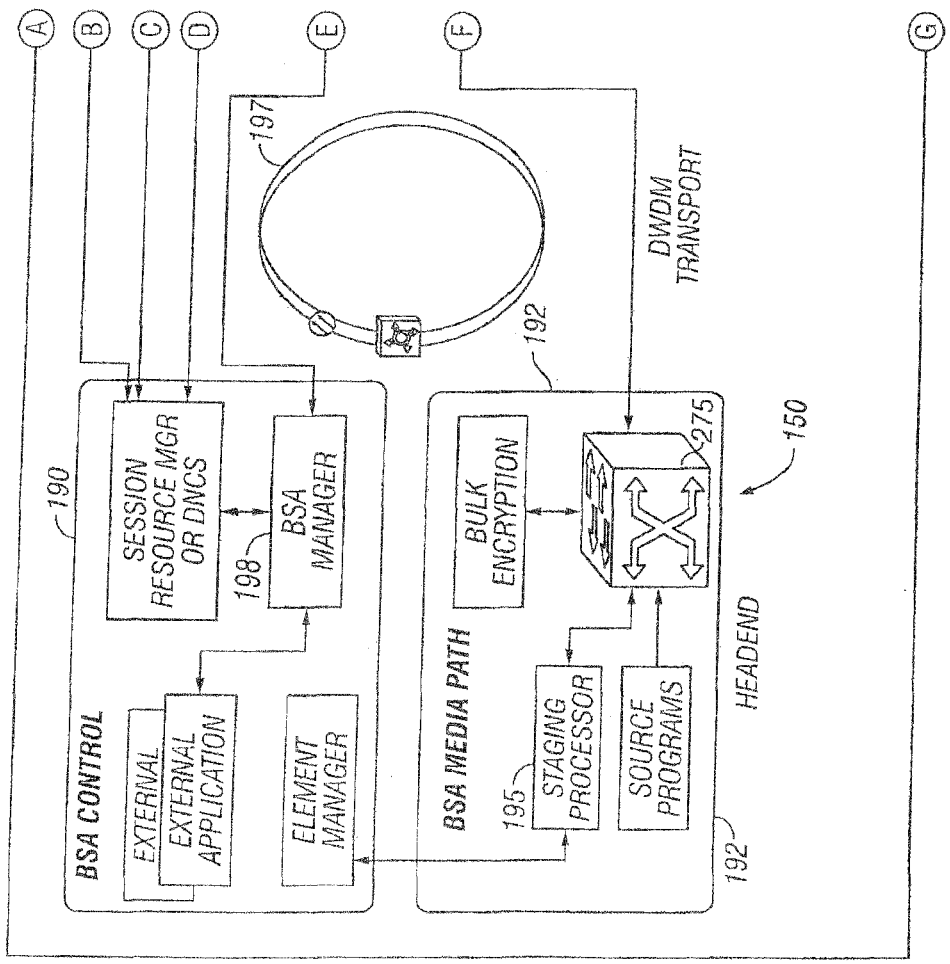
FIG. 1c is a functional block diagram illustrating one exemplary broadcast switched architecture (BSA) network useful with the present invention.
Figure 1C:
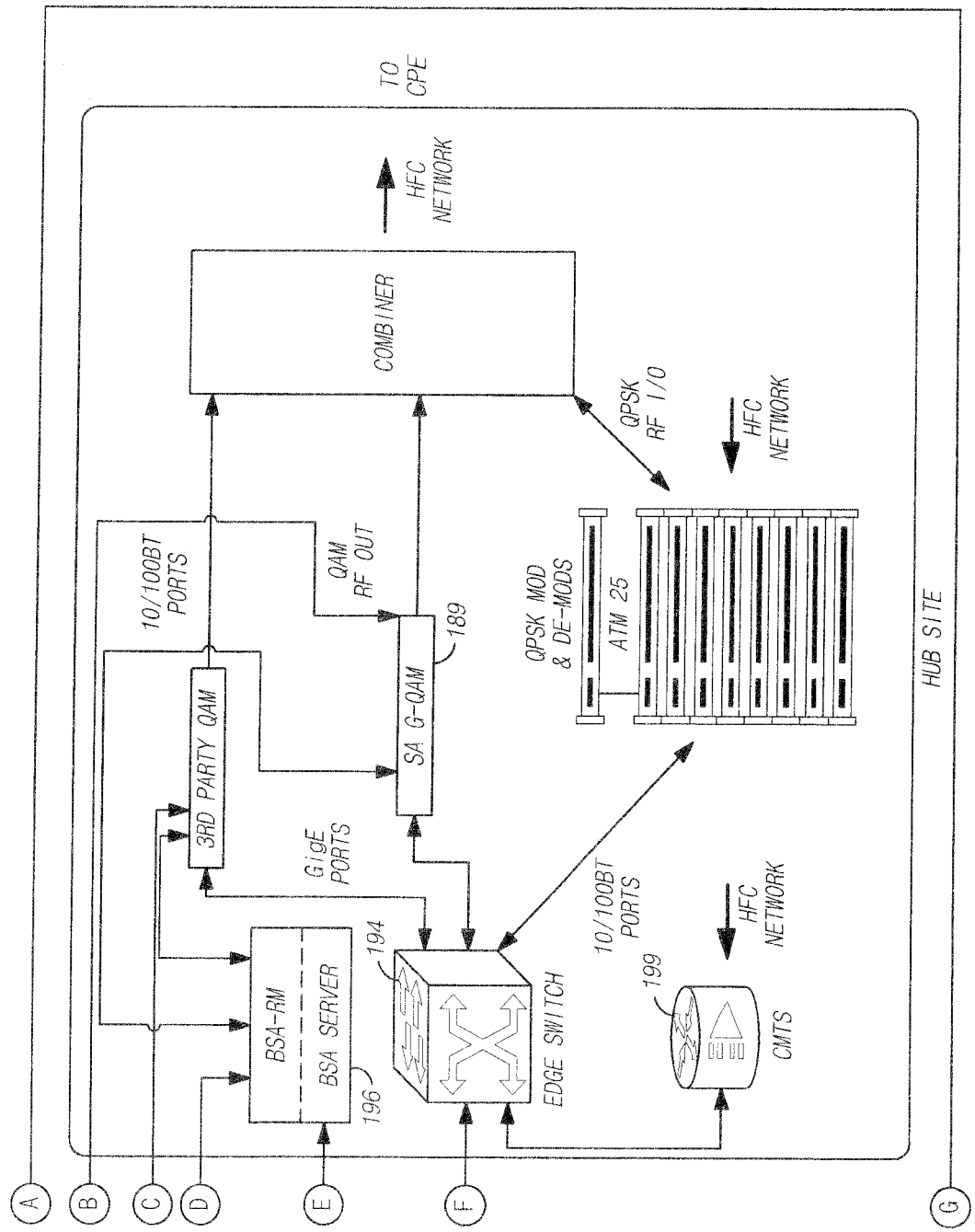

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in co-owned U.S. patent application Ser. No. 11/048,334 filed Feb. 1, 2005, entitled "APPARATUS AND METHODS FOR MULTI-STAGE MULTIPLEXING IN A NETWORK", and issued as U.S. Pat. No. 7,602,820 on Oct. 13, 2009, incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "Technique For Effectively Providing Program Material In A Cable Television System", which issued as U.S. Pat. No. 8,713,623 on Apr. 29, 2014 and is incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG—or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
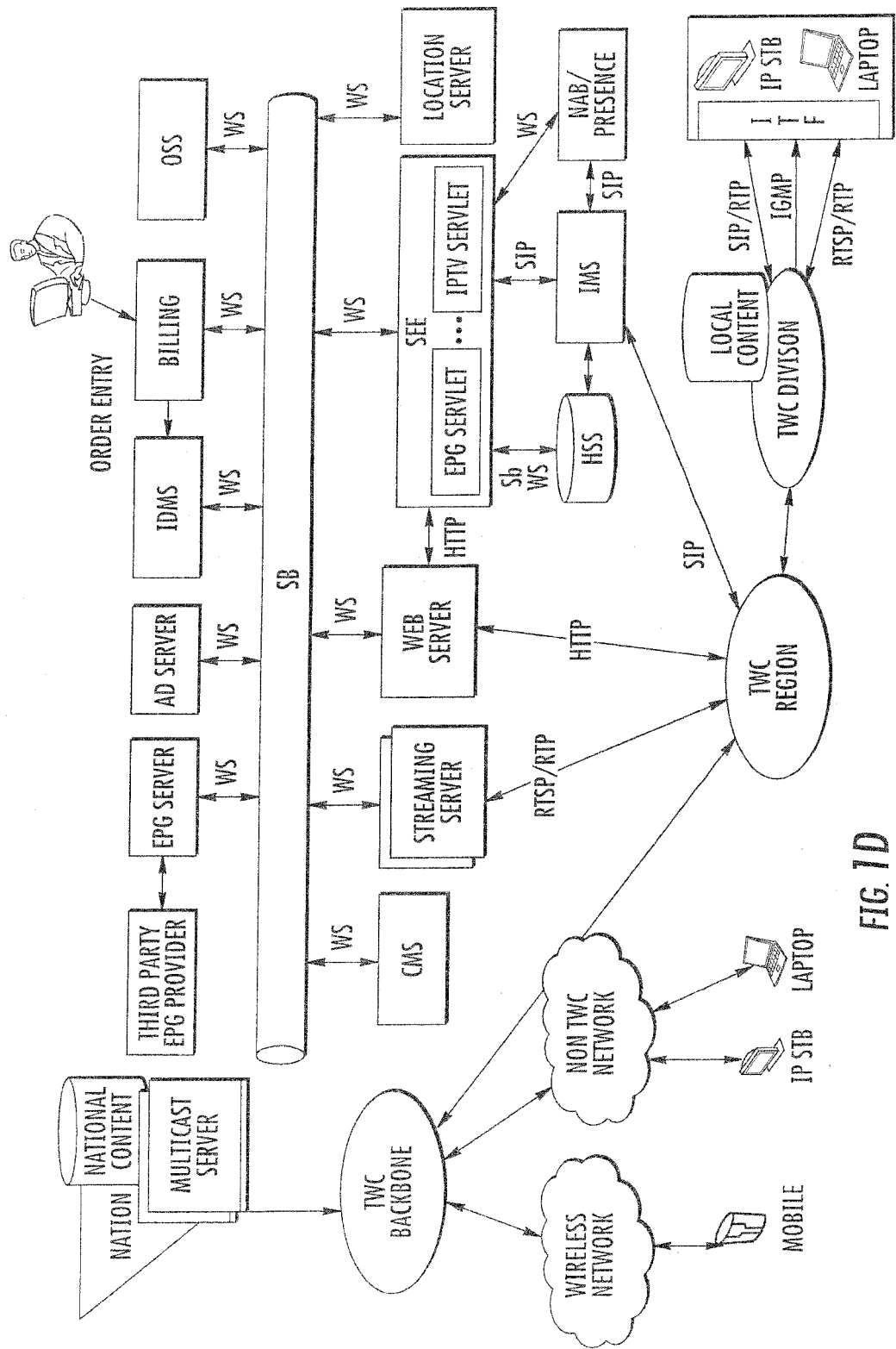
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", previously incorporated herein. Such a network provides significant enhancements in terms of common control of different services, implementation and management of content delivery sessions according to unicast or multicast models, etc.; however, it is appreciated that the various features of the present invention are in no way limited to any of the foregoing architectures.

Rights-Managed Network—

Figure 2:
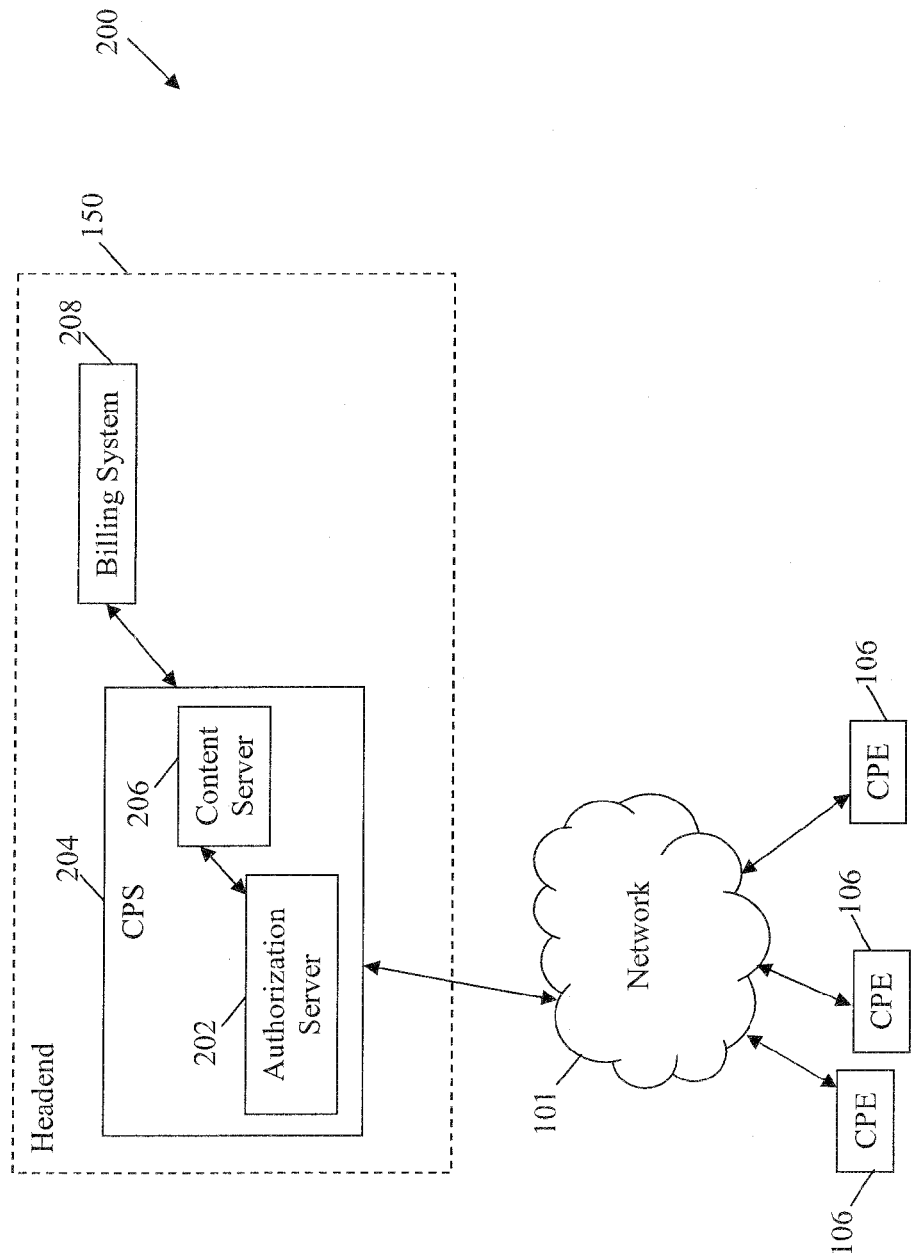
FIG. 2 is a functional block diagram of a content and data distribution network in accordance with the present invention.

FIG. 2 is a high level block diagram of a content and data distribution network 200 configured in accordance with one embodiment of the invention. As illustrated, the network 200 generally comprises a plurality of CPE 106 in communication with a headend 150 via a network 101. As shown, the headend 150 comprises at least a content provisioning system (CPS) 204 and a billing system 208.

As will be discussed in greater detail below, each of the headend entities 202, 204, 206, 208 works with the others to provide authorization and content to the CPE 106. Although illustrated at the headend 150, it is appreciated that one or more of these components 202, 204, 206, 208 may be disposed at various other locations as desired consistent with the architecture implemented (e.g., at the BSA hub in a BSA network).

In order for content to be provided to a CPE 106, it must be determined that the CPE 106 is "entitled" to the content. In one embodiment, this is accomplished via the methods and apparatus disclosed in co-owned U.S. patent application Ser. No. 12/536,724 filed on Aug. 6, 2009 and entitled "SYSTEM AND METHOD FOR MANAGING ENTITLEMENTS TO DATA OVER A NETWORK", issued as U.S. Pat. No. 8,341, 242 on Dec. 25, 2012, which has been previously incorporated herein by reference in its entirety. As discussed therein, in one embodiment, a request for content is received from the CPE 106 at an entity of the CPS 204. The CPS 204 entity obtains information identifying the user account (such as subscriber identification number, account number, etc.) and uses this information to request entitlements from an entitlements server (also located at the headend in one embodiment). Based on the results returned from the entitlements server, the CPS 204 will either grant or deny the request. The entitlements server accesses subscription information in a subscriber database to obtain sufficient information to determine the entitlements of the subscriber.

The CPS 204 comprises one or more entities responsible for providing data and/or content to the CPE 106. The CPS 204 may be used to collectively refer to one or more of the headend entities discussed above with respect to FIGS. 1-1d, and may further comprise additional entities discussed herein below. Content is provided to the CPE 106 via the content server 206 of the CPS 204. In one embodiment of the present invention, the CPS 204 utilizes information obtained from or stored at the authorization server 202 to determine whether a CPE 106 requesting content is authorized to receive the content. In another embodiment, restrictions to the provision of content to a user at a display device associated with the CPE 106 are determined by the CPE 106. Both of these models will be discussed herein in greater detail below.

The authorization server 202 may comprise one or more software applications which utilize information received from the billing system to generate a rights profile for individual ones of the client devices 106. As will be discussed in greater detail below, the authorization server 202 receives requests for access to content from various ones of the CPE 106. The authorization server 202 uses information in the request to query the billing system 208. The authorization server 202 first queries the billing system 208 to determine whether the CPE 106 is registered to a subscriber account. If the device is not registered to a subscriber additional information and/or information present in the request is used to register the device. Once registered, the authorization server 202 receives from the billing system 208 a set of rights associated to the given subscriber account. As noted above, the authorization server 202 uses these rights to generate a rights profile which is transmitted to the CPE 106. The CPE 106 uses the rights profile when determining whether content may be displayed, as will be discussed below.

The content server 206 and authorization server 202 of the illustrated network 200 are communicatively coupled to one another. These are also coupled to the billing system 208. The billing system 208 maintains records regarding subscriber accounts and CPE 106 within each subscriber account and is well known in to those of ordinary skill in the art, thus will not be discussed in further detail herein. If a subscriber's account is changed (such as by adding new CPE 106, changing or adding services or subscription levels, etc.), then information regarding the change is updated at the billing system 208 and propagated to the to the authorization server 202 and the content server 206 of the CPS 204.

In another aspect, the CPE 106 of the present invention may be also compatible with the methods and apparatus disclosed in co-owned U.S. patent application Ser. No. 11/363,578 filed Feb. 27, 2006, issued as U.S. Pat. No. 8,170,065 on May 1, 2012 and entitled "Methods And Apparatus For Selecting Digital Access Technology For Programming And Data Delivery", which is incorporated herein by reference in its entirety. Specifically, a plurality of CPE 106 (electronic devices such as set-top boxes, PMDs, etc.) containing one or more hardware and software functions or modules are used; the hardware and software functions/modules of the different CPE 106 on the network contain various capabilities and options, including conditional access capabilities, video coding or compression capabilities, encryption schema, and network interfaces. These capabilities may be utilized by the content server 206 as a basis for determining which conditional access, coding, encryption, and/or network interfaces to utilize for delivery of content to each particular CPE 106. The CPE 106 of the present invention can accordingly be equipped with such capability if desired in order to, inter alia, profile the CPE 106 for tailoring content or other functions (e.g., CA) to that specific CPE 106 environment. For example, if the CPE 106 (or any of its connected "client devices") has only an MPEG-2 decoder, only MPEG-2 encoded content would be sent to that CPE 106 (or passed on to the client devices), or alternatively the CPE or devices would obtain the necessary codec (e.g., MPEG-4 or Real) from another source, such as an MSO or third party.

Still further, the content server 206 of the CPS 204 may in one embodiment be adapted to utilize the information regarding the CPE 106 capabilities (e.g., capabilities profile) to perform de-encapsulation/re-encapsulation of content where necessary as is disclosed in co-owned U.S. patent application Ser. No. 12/582,619 filed on Oct. 20, 2009, issued as U.S. Pat. No. 9,027,062 on May 5, 2015, and entitled "GATEWAY APPARATUS AND METHODS FOR DIGITAL CONTENT DELIVERY IN A NETWORK", which is incorporated herein by reference in its entirety. As discussed therein, the content server 206 of the present invention may be configured to process content including de-encapsulating the content from a first media file container format and subsequently re-encapsulating the content to a second media file container format which is known to be compatible with the requesting CPE 106. For example, content which is delivered from a host server or other content source may be encapsulated in e.g., MP4, if the receiving CPE 106 is not capable of reading the MP4 files, the content server 206 may re-encapsulate the content to e.g., MPEG-2 or to another format that the receiving CPE 106 is capable of reading. The content server 206 may process received content automatically into various alternative encapsulation formats or, may encapsulate as needed to the format of the specific requesting CPE 106. The processed content may be stored for future use for transmission to other CPE 106 requesting the same content in the particular new format. In yet another embodiment, the content server 206 may further de-encode the content to one or more different codecs. For example, in certain instances receiving CPE 106 may not be configured to read content in H.264, hence, the content is decoded by the content server 206 from H.264 and re-encoded into one or more of a plurality of different codecs such as Real, MPEG-2, WMV, etc.

Figure 2A:
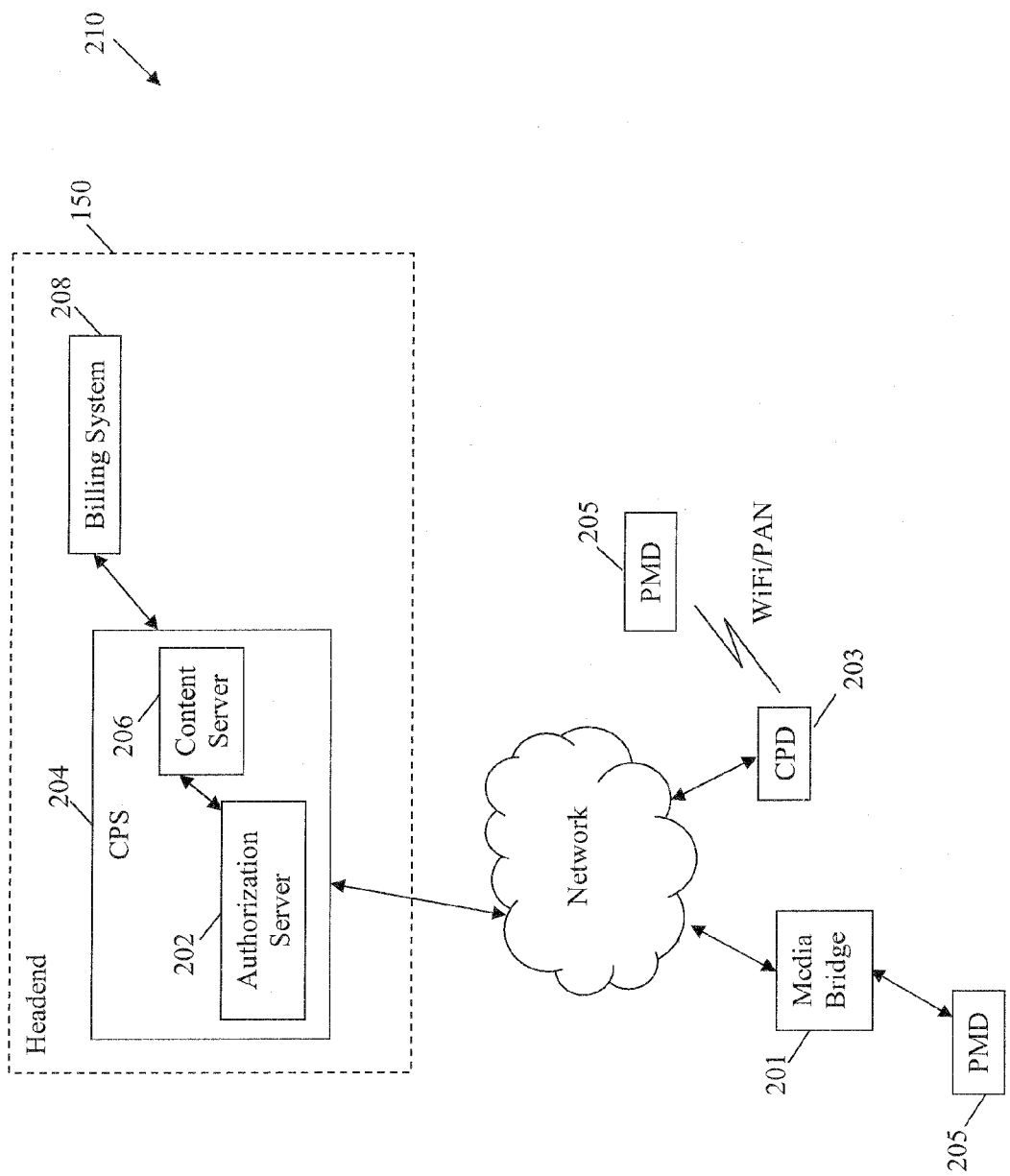
FIG. 2a is a functional block diagram of another content and data distribution network in accordance with the present invention.

Referring now to FIG. 2a, a second exemplary embodiment of a network architecture 210 useful with the present invention is illustrated. As shown, the network architecture 210 generally comprises a cable or satellite network having a headend 150. As discussed in greater detail above, the network headend 150 comprises a CPS 204 comprising at least an authorization server 202 and a content server 206, and a billing system 208. As indicated above, the authorization server 202 and content server 206 cooperate authorize and to provide data and/or content to a plurality of user devices via the network 101, including a converged premises device (CPD) 203 and media bridge 201.

In the illustrated embodiment, a CPD 203 may be in communication with the authorization server 202 of the CPS 204 via the network 101. The CPD 203 may for example be of the type described in co-owned U.S. patent application Ser. No. 11/378,129 filed Mar. 16, 2006, issued as U.S. Pat. No. 8,347,341 on Jan. 1, 2013, and entitled "METHODS AND APPARATUS FOR CENTRALIZED CONTENT AND DATA DELIVERY", incorporated herein by reference in its entirety. As discussed therein, the CPD 203 comprises a WLAN (e.g., Wi-Fi) and/or PAN (e.g., Bluetooth or 802.15) wireless interface. Packetized (e.g., IP) traffic may be exchanged between the CPD 203 and a portable media device (PMD) 205 via, e.g. the WLAN/PAN interface. Hence, in one embodiment, the PMD 205 may request content from the CPD 203. The PMD 205 may be configured in one embodiment to store a rights profile received from the network 101 or, alternatively, the CPD 203 may store the rights profile associated with each device (e.g., PMD 205) requesting access to content. The content may then be sent to the PMD 205 having a suitable complementary wireless interface (which may include e.g., a cellular telephone, smartphone, personal media player, handheld computers, PDA, etc.) via a wireless connection.

Also illustrated at FIG. 2a, a media bridge apparatus 201 is in communication with the network 101. The media bridge apparatus 201 may be for example of the type disclosed in co-owned, co-pending U.S. patent application Ser. No. 12/480,597 filed Jun. 8, 2009 and entitled "Media Bridge Apparatus and Methods", incorporated herein by reference in its entirety. As discussed therein, the media bridging apparatus 201 acts as a connection between a PMD 205 (which may include e.g., an iPod™, handheld computer, smartphone, PDA, etc.) and a user's home network. This bridging apparatus 201 may be used, for example, to convert content stored on the PMD 205 to a format capable of being presented on a user's set-top box or other client device. The bridging apparatus 201 may also be utilized for transmitting content to the PMD 205 (such as by converting the content to a format capable of being stored/presented on the PMD 205) provided the user of the PMD 205 is authorized to receive the content. In one embodiment, the media bridge 201 may be further adapted to store the rights profile for each of the PMD 205 associated therewith. Alternatively, the PMD 205 itself may store rights profiles. Content is then distributed to the PMD 205 according to the rights profile (as will be discussed below) via a connection or interface between the PMD 205 and bridge apparatus 201.

In yet another embodiment (not shown), the CPE 106 may comprise a personal video encoder (PVE) or comparable device. For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network. This functionality can be made part of a separate physical component, or alternatively have some or all of its functionality disposed within the CPE 106 itself. It may also be integrated with other devices (such as connected CPE 106 or PMDs 205). It will be appreciated that the PVE may also be configured to store a rights profile regarding itself and/or regarding other connected devices.

Figure 2B:
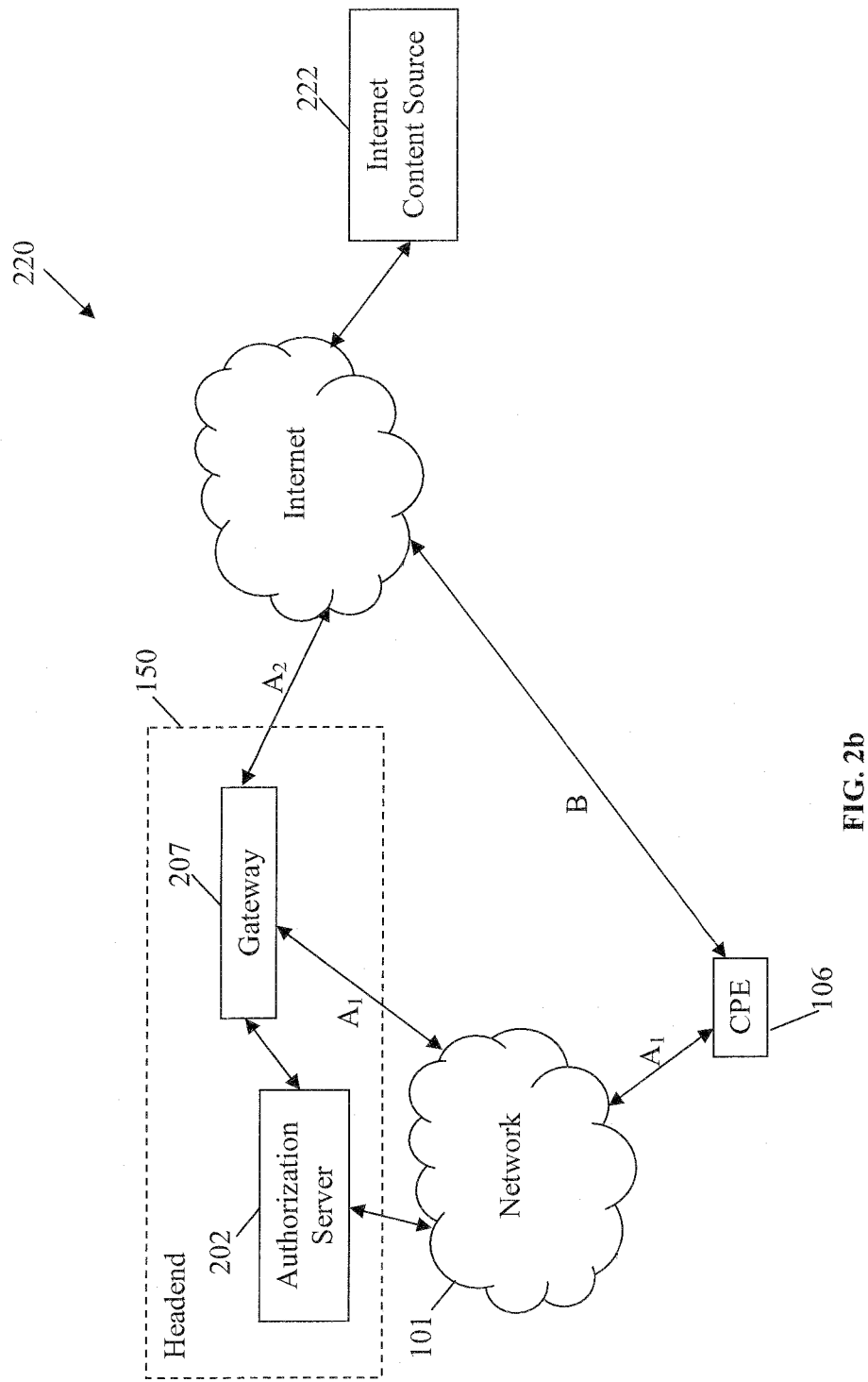
FIG. 2b is function block diagram of yet another content and data distribution network in accordance with the present invention.

Referring now to FIG. 2*b*, yet another exemplary embodiment of a network architecture 220 useful with the present invention is illustrated. FIG. 2*b* illustrates two (2) embodiments for receiving data and/or content from one or more internet content sources 220 at a CPE 106.

In one embodiment, data and/or content is distributed to the CPE 106 via a headend gateway device 207. According to this embodiment, the CPE 106 communicates with the gateway device 207 via pathway $A_1$; which in turn communicates with the content source 220 via the internet at pathway $A_2$. The gateway device 207 of FIG. 2*b* may comprise an entity functioning within the CPS 206 (described above), and in one embodiment, the gateway device 207 may be representative of functionality held by, e.g., the content server 206 of the CPS 206. In other words, the content server 206 may function, in the embodiment of FIG. 2*b* to provide internet data and/or content to the CPE 106. In yet another embodiment, the CPE 106 may perform the aforementioned gateway functionality. The internet content source 207 may utilize information obtained from the authorization server 202 (received via the gateway device 207) to determine whether data/content requested from the CPE 106 may be transmitted thereto (i.e., whether the CPE 106 is authorized to receive the data/content). Alternatively, as will be discussed in greater detail below, restrictions may be imposed by the CPE 106 itself with respect to content to be viewed by a user given a set of rights established by an MSO.

In a second embodiment, the CPE 106 may be configured to communicate directly to the internet (via pathway B) in order to request content from one or more internet content sources 222. As noted previously, data/content may be provided to the CPE 106 from the internet content source 222 only after authorization has been established given information obtained from the authorization server 202 (accessed via the gateway device 207). In another embodiment, restrictions to the provision of content to a CPE 106 are determined by a utilization of rights policies stored at the CPE 106. Both of these models will be discussed herein in greater detail below.

In the embodiment of FIGS. 2, 2*a*, and 2*b*, in one implementation (not shown), content and/or data may be distributed to or from a CPE 106, media bridge 201, and/or CPD 203 (or a cable modem associated with any of these 106, 201, 203) via Worldwide Interoperability for Microwave Access (WiMAX) transport; see IEEE Std. 802.16e-2005 entitled "IEEE Standard for Local and metropolitan area networks—Part 16: Air Interface for Fixed and Mobile—Broadband Wireless Access Systems Amendment 2: Physical and Medium Access Control Layers for Combined Fixed and Mobile Operation in Licensed Bands" which is incorporated herein by reference in its entirety). For example, multiple WiMAX base stations may be established by the MSO or other content provider. One or more of the WiMAX stations transmit programming or other content and/or data (including e.g., rights profiles) to the CPE 106, media bridge 201, and/or CPD 203 (which may include simultaneously, so as to ensure a robust signal is received and to potentially support any QoS requirements). In one embodiment, a CPE 106, media bridge 201, and/or CPD 203 having an associated cable modem may transmit and receive out-of-band data via WiMAX transport. In yet another embodiment, in-band content and/or data may also be sent/delivered using the aforementioned WiMAX transport. In this fashion, the WiMAX transport acts as a wireless data "pipe" in parallel to the normal DOCSIS or in-band RF channels (e.g., QAMs) transmitted over the cable or satellite distribution network.

In the context of the present invention for example, the CPE 106, media bridge 201, and/or CPD 203 might transmit rights profile requests destined for the authorization server 202 via the cable network 101, yet receive the requested rights profile via the WIMAX broadband interface. Alternatively, the WiMAX interface could be used to transmit the requests to the authorization server 202 (via a WiMAX interface associated with the latter), with delivery of the requested content being via in-band RF QAMs. The above-described WiMAX embodiment may likewise be applied to the transmission and receipt of content via the content server 206. Various permutations of the foregoing will be recognized by those of ordinary skill given the present disclosure.

In another embodiment, the network architecture described in co-owned, U.S. Provisional Application Ser. No. 61/256,903 filed on Oct. 30, 2009 and entitled "Methods and Apparatus for Packetized Content Delivery Over a Content Delivery Network", previously incorporated herein by reference, may be utilized in conjunction with the present invention. As discussed therein, a substantially session-based and packetized content delivery approach (e.g., using the well known Internet Protocol) which allows for temporal, device, and location flexibility in the delivery of the content, and transportability/migration of user sessions (i.e., the "four-anys" previously described), as well as service/content personalization (e.g., on a per-session/user basis) and blending (integration) may be utilized. This approach uses a common or unified delivery architecture in providing what were heretofore heterogeneous services supplied by substantially different, and often vendor-specific, networks.

Moreover, the apparatus and methods discussed in the aforementioned provisional application disclose providing enhanced content access, reproduction, and distribution control (via e.g., a DRM-based approach and other security and content control measures), as well as quality-of-service (QoS) guarantees which maintain high media quality and user experience, especially when compared to prior art "Internet TV" paradigms. In one exemplary implementation, the network is based on an IMS (IP Multimedia System) which includes SIP session protocols, as well as a Service Delivery Platform (SDP). The IMS/SDP also uses a common control plane and service layer, which advantageously provide a high level of service integration, and greatly enhanced opportunities for truly "blended" content delivery and service control. In another implementation, the network comprises both "managed" and "unmanaged" (or off-network) services, so that a network operator can utilize both its own and external infrastructure to provide content delivery to its subscribers in various locations and use cases (thereby providing content to media player running on a plurality of different devices). In one variant of this approach, network services are sent "over the top" of other provider's infrastructure, thereby making the service network substantially network-agnostic. In another variant, a cooperative approach between providers is utilized, so that features or capabilities present in one provider's network (e.g., authentication of mobile devices) can be leveraged by another provider operating in cooperation therewith.

In another aspect of the invention, a substantially network-based user interface (UI) architecture (running in conjunction with the media player application) is employed which permits the network operator (or a designated proxy entity) to manage and rapidly reconfigure the UI for particular premises, subscribers (or even particular devices of that subscriber/premises), thereby greatly aiding personalization and service velocity. For example, a new service selected by a user can be reflected in that user's UI simply based on a download and installation from a network "UI" server, so that no service call or "truck roll" is needed. Moreover, the different UIs of the network operator can be adapted to different device paradigms (e.g., premises DSTB/HDTV monitor, PC, laptop, handheld mobile device, etc.), so that a common user and/or account "theme" and preference set is maintained across the different devices. This UI architecture can also leverage next-generation content display, organization, interactivity, and recommendation engine technologies, thereby providing for a richer and more subscriber-specific (personalized) media experience.

The foregoing components and methods also advantageously provide significant new opportunities for business models and increased revenue/subscriber retention, including for example blended service offerings (i.e., heretofore distinct services being highly integrated with one another both at the application layer and control plane), and unification of device hardware and software environments, including reduction of the different types of hardware/software needed to access the various services.

Media Player—

In one aspect of the invention, a media player capable of implementing the content access methods of the present invention is disclosed. In one embodiment, the media player comprises a software application configured to be stored on a storage device of a host CPE or client device (e.g., portable wireless device, laptop computer, desktop computer, set top box, gateway, converged premises device, etc.), and executed by the processor of the host, although it will be appreciated that various aspects of the functionality of the media player may be embodied in firmware or even hardware.

When executed, the media player provides a number of functions, including a directory service for the host device media storage (i.e., that which is stored on the host or a connected storage device). For example, the well known DLNA (Digital Living Network Alliance) protocols described in DLNA Networked Device Interoperability Guidelines Expanded, March 2006 and subsequent expanded version dated October 2006, each of which is incorporated herein by reference in its entirety, may be used to provide such a directory function on another DLNA-compatible device, A network based directory function may also be utilized to provide the user with a directory of the content available for download if not resident on the host (e.g., akin to an program guide or EPG).

When content is selected by the user, the applicable methodology described elsewhere herein (i.e., access of local content, or request and download of remote content) is performed as applicable. For instance, in one variant, the encoded content is already resident on the host device, and the media player attempts to access that content at its prescribed storage location. Specifically, the player checks its current resident rights profile (or request one from the network to which it is connected) to determine if the device and/or user (depending on whether a device-based, user-based or composite (e.g., device- and user-based hybrid) approach is implemented) has the right to access the content unencoded, and if so, whether any restrictions or limitations apply. If access is permissible, the media player utilizes an indigenous content decoding function (e.g., key) to decode and play the content. This decoding function or key may be for example part of a symmetric or asymmetric encryption key or pair, a digital certificate, etc., or any number of other functions known to those of ordinary skill in the data encoding/encryption arts. For instance, the key or other decoding information may be held resident within a secure microprocessor (SM, or "secure micro", such as that described in co-owned U.S. patent application Ser. No. 11/584,208 entitled "Downloadable Security and Protection Methods and Apparatus" filed Oct. 20, 2006, which issued as U.S. Pat. No. 8,520,850 on Aug. 27, 2013 and is incorporated herein by reference in its entirety.

In another variant, the content is not present on the host, and the user selects the content for playback via the aforementioned network directory function. The host device (media player) then establishes communication with the CPS (e.g., via establishment of a SIP session or other session-based protocol), and requests download of the selected content to a local storage device (e.g., flash memory or the like on the host). The encoded content is downloaded via an IP transport, in-band channel, OOB channel, WiMAX transport, etc. to the host and stored. The media player then checks the rights profile (or otherwise obtains it from the network), and then accesses the content if permissible as described above.

In one embodiment, content protection is signaled in the content directory service. The individual content that the UPnP client accesses is marked accordingly.

In one access paradigm, the media player is completely device agnostic, and the access to content is purely user-based. For instance, the media player can be downloaded (e.g., as a open or commodity software application akin to the well known Adobe™ Reader application), and run on any device (whether registered within the network to the subscriber wishing to access content, or not), and the desired content accessed via a user authentication procedure. For example, the media player may be configured to display a user interface such as a window or other login screen upon startup of the application, or upon selection of content from a directory function. The user then enters a user name and password, which the media player sends back to the CPS 204 (authorization server 202) to determine if the user name/password match any entries in the subscriber database and if so, what rights profile is associated with that entry/account.

Other security features such as challenge questions, icons or images which must be selected by the user, etc. can also be used in authenticating the user, as can yet other types of information such as biometric data. The media player then, upon successful authentication of the user, receives the rights profile for that user (which may be encrypted or otherwise protected as desired so as to prevent MITM or spoofing attacks and/or provide data confidentiality and integrity; e.g., via a cryptographic residue of the type well known in the cryptographic arts), and filters the content directory based on the profile (e.g., removes or makes inaccessible any content to which the user has no access rights).

When the user selects an encoded content element to which they do have access rights, that content is downloaded if not resident on the host, and decoded by the media player. Any other use restrictions (e.g., limited time or number of plays, etc.) are also imposed by the media player as applicable. Specifically, in one embodiment, the media player application imposes the rights profile rules via the software and user interface; e.g., by preventing the user from initiating too many plays, playing the content too long, attempting to copy the media content data to another location or platform, etc.

The decoding key may also be downloaded with the rights profile (or via separate transport) once the user has been authenticated to the CPS. In another variant, however, the decoding key or algorithm is indigenous to the media player irrespective of who uses it or where it is used; the communication from the authorization server merely enables the media player to use its indigenous decoding function. In yet another variant, the authentication of the user enables the download of a seed which is used as an input to a cryptographic hashing algorithm, the output of which provides a unique hash which can be used to decode the content.

Using the foregoing device-agnostic approach advantageously allows a subscriber to access MSO content anywhere, and on any device, whether registered to that user in the parent network or not. The decoding capability of the media player, coupled with the rights profile and user authentication procedure, ensures that only a valid subscriber can download and decode the requested MSO content. However, in one variant, intra-session device continuity is required; e.g., by transmitting the MAC address or other unique identifying information of the device as part of each user authentication request and request for content, so as to ensure that the same device from which the user authentication request was generated is used to receive the cryptographic information, and the encoded content (as applicable). Other mechanisms for enforcing device continuity within a session will be recognized by those of ordinary skill, given the present disclosure.

In another variant, a device-based authentication is used (whether alone or in conjunction with the aforementioned user-based authentication). For example, the device on which the media player application is disposed may have a certain MAC address or other unique identifying information, which is registered with the MSO (e.g., in a subscriber database or other entity accessible to the authorization server 202). When the user requests a content element (or wants to implement a directory function), the request includes the MAC address of the requesting host on which the media player is disposed (if not already known to the AS 202). This address is validated against a subscriber or other database (e.g., IMS HSS) which correlates the MAC address with the account, thereby authenticating the device to the network (and permitting further access to the current rights profile associated with that device/account).

In yet another embodiment, the download of content from the network after user and/or device authentication is permitted only to a trusted domain (TD). For example, the techniques for enforcing a trusted domain described in co-owned U.S. patent application Ser. No. 11/584,208 filed Oct. 20, 2006 and entitled "Downloadable Security and Protection Methods and Apparatus", which issued as U.S. Pat. No. 8,520,850 on Aug. 27, 2013 and which has been previously incorporated herein by reference in its entirety, may be used consistent with the invention. As discussed therein, a network architecture that provides for enhanced conditional access (CA), trusted domain (TD), and digital rights management (DRM) capabilities is given. This network architecture comprises apparatus useful at, inter alia, the headend or distribution hub of a cable network, for implementing a download paradigm for legacy or newly developed CA, TD, and DRM software and cryptographic protection schemes. This allows the network operator, and even the third party content provider by proxy, to exert additional control on viewing, reproduction, and migration of content distributed over the network, including to the media player of the present invention. In one embodiment, these enhanced capabilities comprise downloadable software modules (images), and an associated decryption key that facilitates decryption of the downloaded software images. In contrast to prior art approaches of merely encrypting the content itself (such as via a DES or AES algorithm via a symmetric or asymmetric key approach), the exemplary embodiments of the present invention allow for the download of secure software images, which may be used to, inter alia, ensure security of the downloaded images and also migrate protected content to other platforms (e.g., other media player's such as media player 331 or devices) in the user or client domain so as to extend the "trusted domain".

Similarly, such restrictions can be imposed relative to an authorized service domain (ASD) of the type described in co-owned U.S. patent application Ser. No. 11/592,054 filed Nov. 1, 2006, issued as U.S. Pat. No. 8,732,854 on May 20, 2014, entitled "Methods and Apparatus for Premises Content Distribution", and incorporated herein by reference in its entirety, may be used consistent with the invention. As discussed therein, a mechanism for devices connected to a home network to exchange information, and ultimately share or transfer protected content (including for example audiovisual or multimedia content, applications or data) in a substantially "peer-to-peer" fashion and without resort to a central security server or other such entity is provided. Authorized "browsing" of the content present on one device by another device is also provided. In one exemplary embodiment, an application-level message exchange functionality is described; using this message exchange, the premises devices can advertise their security capabilities relating to, e.g., protected content, and query other devices for their security capabilities (e.g., may transfer rights profile as will be discussed below).

Accordingly, in one aspect, a security architecture and associated logic residing on two or more different client devices or domains, wherein security information (and ultimately protected content) can be exchanged without resort to a centralized facility such as a cable headend process or entity is utilized. For example, in one embodiment, a "server" CPE and a "renderer" CPE are disposed within a premises network. Message exchanges (including rights profile) between the sever and renderer identify and validate each entity and its security package or framework capabilities, as well as other capabilities that may be necessary to effect the exchange and use of the protected content, data or application (e.g., the presence of an appropriate codec, algorithm, network interface, etc. as set forth in the rights profile). These exchanges are all effectively automatic and transparent to the user, thereby making device location and identification, content/data/application exchange, and browsing seamless. Advantageously, the present invention can be seamlessly implemented using existing security frameworks and constructs, such as the Authorized Service Domain (ASD) framework, thereby extending these frameworks with additional capabilities and services including local (e.g., premises network discovery, browsing, and content streaming or transfer).

The two above-provided embodiments may be distinguished from one another (e.g., peer-to-peer approaches establishing a trusted domain distinguished from an embodiment utilizing ASD) in that, inter alia, the ASD approach is conducted entirely between two or more entities that have been authenticated and are part of an authorized service domain, thereby assuring that the participants to any transaction (e.g., content browsing, streaming, or download) are authenticated and authorized to browse or receive the content. Moreover, exemplary ASD embodiments are implemented according to an entirely dynamic (e.g., "plug and play") component interface paradigm, thereby obviating many networking protocols and related compatibility issues associated with peer-to-peer communication over the Internet or other such WANs.

It will also be recognized that the media player may incorporate and be compatible with one or more digital rights management (DRM) schemes such as Windows Media Player DRM version 10, 11, and 12 (and subsequent versions), Adobe/McAfee DRM, and/or Sony Ericsson DRM, etc. Such schemes may be used, inter alia, to enforce digital rights and copying/use limitations of the type well known in the art. The use of DRM may also provide access control functions of the type described herein.

For example, key exchange and rights may be defined by the selected DRM. In one advantageous aspect of the present invention and as discussed elsewhere herein, the MSO associates these rights (e.g., user rights/content rights) to a user. For instance in order to create a personalized content package (e.g., a sports package), the package is mapped to so-called "domains" in DRM.

The media player application may be downloadable (e.g., over an IP transport such as the Internet), via wireless transport (e.g., WiMAX or WLAN), or via in-band or OOB channels of the content distribution network of FIGS. 1-1*d*). Alternatively, it may be pre-loaded onto a given end-user platform, or even an intermediary device (e.g., gateway or CPD).

In yet another embodiment of the invention, the CPS communicates with an application or other server (see e.g., the application server 104 of FIG. 1) which is tasked with custom-configuring the media player application downloaded to each CPE or client. For instance, in one variant, the successful authentication of the user and/or device causes a message flow from the CPS to the AS, causing the latter to provision an "agnostic" version or template of the media player according to user and/or device-specific parameters, such that that media player can only be used by that user or device to decode content. In the device-based variant for example, the MAC address of the device may be used to generate a cryptographic residue or hash which must be matched before access to the player functionality is enabled; this hash can only be matched when a similar hash is generated at the requesting device, and only then is decoding/playback enabled. As another example, in the context of a user-based scheme, the user's ID or password is used as an input to a hash algorithm which "locks" the player functionality until the user enters the appropriate data.

The media player application of the invention may also be used in conjunction with a personalization or recommendation engine which can utilize information about the subscriber (e.g., demographics, historical use patterns, etc.) to make recommendations or personalize the content for that user. For example, the methods and apparatus described in co-owned U.S. patent application Ser. No. 12/414,576 filed Mar. 30, 2009, issued as U.S. Pat. No. 9,215,423 on Dec. 15, 2015, and entitled "Recommendation Engine Apparatus and Methods", and co-owned and co-pending U.S. patent application Ser. No. 12/414,554 filed Mar. 30, 2009 and entitled "Personal Media Channel Apparatus and Methods", each of the foregoing incorporated herein by reference in its entirety, can be used with the media player of the present invention. In one such embodiment, the user login via the media player/RMA is communicated to the CPS, which contacts the recommendation engine with the user identity. The recommendation engine uses the user identity to access a database of user-specific preference/historical data, which is used by the engine to generate recommendations which can be used to populate a recommendation list sent to the requesting CPE (e.g., as part of the aforementioned EPG or directory function). The recommendations are advantageously tailored to the particular user. Moreover, it will be appreciated that in cases where user-based authentication is used, the aforementioned recommendations advantageously remain user-specific, even on a non-user platform (e.g., their friend's CPE), since the recommendations are accessed based on a particular subscriber or account basis rather than on a device basis. However, if the device information is known and it correlates to the same subscriber/account (e.g., as reflected in the MSO's billing system or other subscriber database), then the device can be used as a basis of input to the recommendation engine as well.

Moreover, in another variant, the user(s) of the exemplary embodiment of the media player application are given the option to "switch" or "merge" user and device bases for input to the engine. Specifically, in the "switch" function, the user can switch between a user-based input and a device-based input, such as in the case where the user logs into the network using the media player disposed on a friend's CPE (device). It may be that the two friends want to access the recommendations that would be generated for the owner of the host CPE, rather than the user (non-owner) who has logged in. Similarly, under the "merge" function, the device-based and user-based inputs are both selected and input to the recommendation engine (or otherwise used for content personalization). These functions can be invoked for example using an icon on the media player display, a pull down menu option, FFK or SFK, etc.

It will also be recognized that the term "user-based" as used herein may refer to an aggregation of users (e.g., a subscriber account associated with a household having multiple members), or a single user (e.g., one specific person within the aforementioned household). Hence, "user-based" authentication and content provision (including generation of recommendations) can be based on a subscriber account, or on one individual. Advantageously, the present invention contemplates that the user login will determine which of the foregoing options will be employed during servicing of content requests as part of that login session. For example, an individual associated with a household might use the "household" or family login, whereby their content requests, etc. are serviced based on the household's profile, demographics, and subscriber account. Alternatively, if that same user logs in as an individual, the portions of the MSO subscriber database specific to that user will be applied (in conjunction with any data that is identical to that for the household account, or not specified for the individual). For instance, the individual might have very different demographics, preferences, and their own set of devices, as compared to the household. In this fashion, the user can by way of user-based login (or even device based login in the case where the user's device is uniquely associated to them alone) personalize their media player experience.

Moreover, configuration data can be passed to the RMA/media player with the rights profile which can be used by the media player for personalization; e.g., "skins", look and feel for the UI of the media player, etc. Recent selections by that user can also be populated based on data received from the rights profile (or otherwise maintained on the host platform).

Exemplary CPE—

Figure 3:
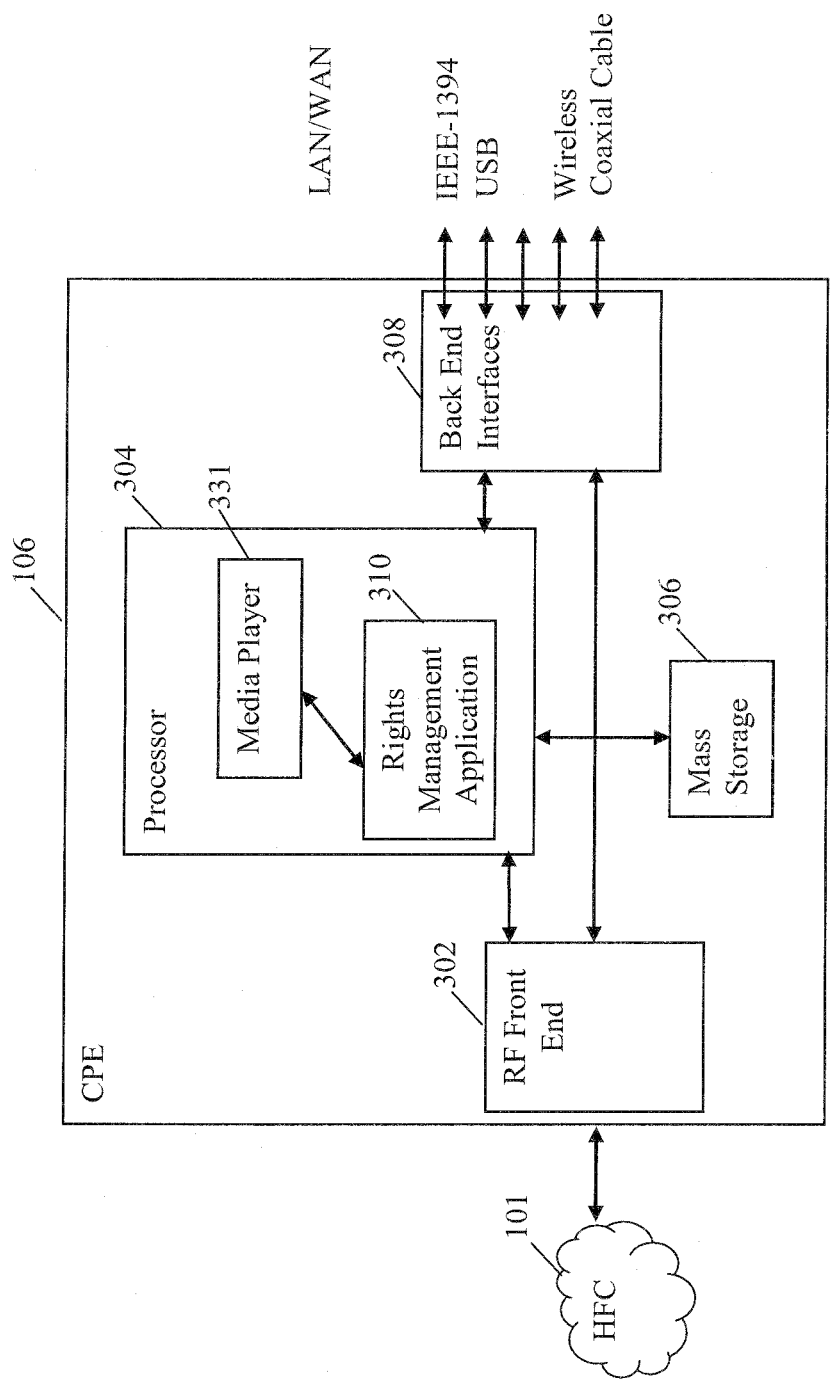
FIG. 3 is a functional block diagram of an exemplary CPE for use with the present invention.

FIG. 3 is a block diagram of one exemplary embodiment of the CPE 106 of FIGS. 2 and 2*a*. The exemplary CPE 106 includes an RF front end 302, a processor 304 and associated storage 306, and a plurality of back end interfaces 308 for communication with other devices.

The illustrated CPE 106 can assume literally any discrete form factor, including those adapted for desktop, floor-standing, or wall-mounted use, or alternatively may be integrated in whole or part (e.g., on a common functional basis) with other devices if desired.

It will also be recognized that the CPE configuration shown is essentially for illustrative purposes, and various other configurations of the CPE 106 are consistent with other embodiments of the invention. For example, the CPE 106 in FIG. 3 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

The RF front end 302 of the illustrated CPE 106 receives content and/or data from the HFC network 101. In one embodiment, the RF front end 302 of the CPE 106 may comprise a traditional video RF front end 301 (e.g., tuner) adapted to receive video signals over, e.g., a QAM. For example, the RF front end 301 may comprise one or more tuners, a demodulator, decryption module, and demultiplexer of the type well known in the art, although other configurations may be used. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams is distributed across two or more QAMs. Additionally, the RF front end 301 modulates, encrypts/multiplexes as required, and transmits digital information for receipt by upstream entities such as the CMTS. Digital data received via the RF front end 302 may include for example MPEG-2 encoded programming data that is forwarded to a television monitor via a video interface. Programming data may also be stored on the CPE storage unit 306 for later distribution by way of the video interface, or using a Wi-Fi interface, Ethernet interface, Firewire (IEEE Std 1394), USB/USB2, or any number of other such options.

The RF front end 302 may further comprise a cable modem (CM) of the type known in the art. In this fashion, and content or data normally streamed over the CM can be received and distributed by the CPE 106, such as for example packetized video (e.g., IPTV). In accordance with the exemplary embodiment of the invention, the DOCSIS cable modem may also be utilized for delivery of traditional broadband Internet services. As discussed below, content and/or data sent to the CPE 106 will only be presented to those subscribers having appropriate rights to receive the data/content.

Programming and other types of data including pictures, video, music or MP3 files, software applications, metadata files, etc. may also be received by way of the various digital interfaces in the CPE 106. These data may be stored locally (e.g., in the CPE storage unit 306) or even on a device or network agent in communication with the CPE 106, for later use by a user as is discussed in co-owned U.S. patent application Ser. No. 11/378,129 filed Mar. 16, 2006, issued as U.S. Pat. No. 8,347,341 on Jan. 1, 2013, and entitled "METHODS AND APPARATUS FOR CENTRALIZED CONTENT AND DATA DELIVERY", previously incorporated herein by reference in its entirety. As discussed therein, a user may receive a JPEG or other image from a friend's cellular phone camera, which can then be "pushed" (e.g., via WAP push, IMS, Bluetooth™ OBEX K-11 exchange, etc.) to a corresponding interface on the CPE 106, wherein the image is stored on the mass storage device 306. Similarly, video data from a connected DVD player/burner might be streamed from the player to the CPE 106 for storage thereon (or distribution via yet another interface, such as via the Ethernet interface to the user's connected PC or via Wi-Fi interface to their laptop).

The CPE 106 mass storage device 306 of the illustrated embodiment comprises a Serial-ATA (SATA) or Ultra-ATA (also known as Ultra-DMA, or ATA-4/5/6/7) hard disk drive for the operating system and content storage of at least 500 GB, although higher capacities and even RAID arrays may be used for this purpose. The CPE 106 hard disk is preferably removable without the need for tools, and the CPE 106 is also configured allow for an external USB (e.g., USB 2.0) drive or other easily removable storage device to be attached and automatically added to the existing storage. It will also be appreciated that USB keys of the type well known in the art can be used consistent with the USB port(s) of the CPE 106, so as to make the data storage device highly mobile and of very small size.

During operation of the CPE 106, a rights management application 310 (located in the storage unit 306) is run on the microprocessor 304. The rights management application 310 controls communication with the authorization server 202 and content server 206, controls content playback according to a rights profile, and provides various other functions within the CPE 106. In one embodiment, the rights management application 310 is required to obtain a rights profile in order for content to be requested from a content source (which may be remote or local) and displayed to a user.

In one aspect, the rights management application (RMA) 310 comprises a computer program which when executed, facilitates communication between the CPE 106 and the authorization server 202. The RMA may be combined with the functionality of the media player application (described in greater detail subsequently herein) so as to form a single application, or may alternatively be separate from the media player. For example, the CPE 106 may, via the aforementioned software 310, transmit a request for a rights profile to the authorization server 202 upon request of content (or a content directory) from the media player application. It is appreciated that a rights management application 310 running on a first CPE 106 may also be used to request a rights profile on behalf of another CPE 106 connected to or associated with the first CPE 106, as discussed in greater detail elsewhere herein.

In response to the request, the authorization server 202 sends the CPE 106 a rights profile (described in greater detail below). The rights management application 310 is configured to determine whether the received rights profile should be stored (such as at the storage device 306) or whether it should be transmitted to a second entity (such as a content provider or another CPE 106). The rights management application 310 may further be configured to determine, where necessary, whether the rights profile relates to the CPE 106 which received it, to another CPE 106, or both (e.g., via MAC address or other device-specific information).

In another aspect, the rights management application 310 is adapted to facilitate content requests to the content server 206. In response to the content requests initiated by the user and sent by the CPE 106, the content server 206 provides the content. The rights management application 310 uses rules set forth in the rights profile to determine if the user is entitled to receive the content. If the user is entitled per the rights profile, the content is decoded and provided to a display device associated with the CPE 106. If the user is not entitled to view the content, the rights management application 310 directs a notification be displayed on the display device associated with the CPE 106 thereby, informing the user that he/she does not have rights to view the content. These notifications may also be context-specific; i.e., include reasons for why that particular request was denied (e.g., not a valid MSO subscriber, too many plays, time limit for viewing expired, etc.), or what the available rights are (i.e., cannot move or copy content, but can watch five (5) more times on present device, etc.).

As noted previously, the rights management application 310 may act on behalf of another CPE 106 or client device. Thus, a first CPE 106 may request content on behalf of a second CPE 106. Then, using the rights profile of the second CPE 106 (which is either sent in the content request or stored at the first CPE 106) the rights management application 310 (running on the first CPE 106) determines whether the second CPE 106 may receive the content and, as above, either decodes the content and streams it to a display device associated with the second CPE 106, sends the content to the second CPE in encoded form along with the necessary information to decode, or provides a notification to the user. For instance, in another embodiment, the CPE 106 includes DLNA (Digital Living Network Alliance) functionality via one or more interfaces. DNLA is a standard used by manufacturers of consumer electronics to allow entertainment devices within a premises to share their content with each other across an interface or premises network. The DLNA specification ("DNLA Networked Device Interoperability Guidelines" dated March, 2006 and updated October, 2006, incorporated herein by reference in its entirety) classifies devices into four categories: (i) digital media servers (DMS); (ii) digital media players (DMP); (iii) digital media controllers (DMC); and (iv) digital media renderers (DMR). The standard also includes support for DRM. DLNA is primarily intended simplify use of digital media between different consumer electronic (CE) devices. For example a DLNA compliant monitor may readily interoperate with a DLNA compliant PC to play music, video, or share photos.

The DNLA-enabled CPE of this embodiment therefore has the capability to share media/content with other DNLA-enabled devices within the user's premises; e.g., over the premises network. Hence, the media player application described above may be disposed on any such device within the premises, and content received by the CPE (e.g., from in-band, WiMAX, IP, or other transport) can be moved to another device, and the media player thereon used to access the content. The CPE can also act as a proxy or gateway for connected device requests, content receipt, and other messaging to the headend, as previously described herein. The CPE and connected media device may also assume various of the foregoing roles (i)-(iv) in terms of DNLA; e.g., the CPE may act as a media server (DMS), and the client or media device as a DMP and/or DMR. Other combinations will be recognized by those of ordinary skill given the present disclosure.

The aforementioned DLNA guidelines set forth how content may be represented. In one embodiment, rights to that content are stored along with the in-band protected DRM content.

In one variant of the invention, if the rights profile indicates that a user is not entitled to access content, the notification may further include instructions to the user regarding the purchase of the rights to the content. For example, the notification may list a telephone number or web address where the user may change his/her subscription level so as to include access to the content. Additionally, the notification may include an interactive "button" or "link" which the user may select in order to, from his/her display device, increase his/her subscription level or pay a predetermined premium for receiving access to the content (such as is used in pay-per-view models).

In accordance with yet another embodiment of the invention, the CPE 106 advantageously provides the ability to ingest content from other devices connected thereto or associated therewith (such as via a Multimedia over Coaxial (MoCA) network); e.g., from a DVR at the premises. The ingested content may then be streamed to other devices associated with or connected to the CPE 106 based on the rights profiles of these receiving devices, whether in decoded or encoded format.

In one embodiment, the CPE 106 may be further adapted to perform de-encapsulation/re-encapsulation of content where necessary as is disclosed in U.S. patent application Ser. No. 12/582,619 filed on Oct. 20, 2009, issued as U.S. Pat. No. 9,027,062 on May 5, 2015, and entitled "GATEWAY APPARATUS AND METHODS FOR DIGITAL CONTENT DELIVERY IN A NETWORK", previously incorporated herein. In this embodiment, the CPE 106 is adapted to processes content from a first media file container format to one or more second media file container formats which are compatible with the CPE 106 capabilities or with the capabilities of other CPE 106 in communication therewith. For example, content which is delivered from a host server may be encapsulated in e.g., MP4, if the receiving client device(s) are not capable of reading the MP4 files, the gateway device may re-encapsulate to e.g., MPEG-2 or other format that the receiving device is capable of reading. The CPE 106 may be further configured to de-encode the content and re-encode to one or more different codecs (i.e., transcode), as well as or alternatively trans-rating the bitrate of the content.

Exemplary Authorization Server—

Figure 4:
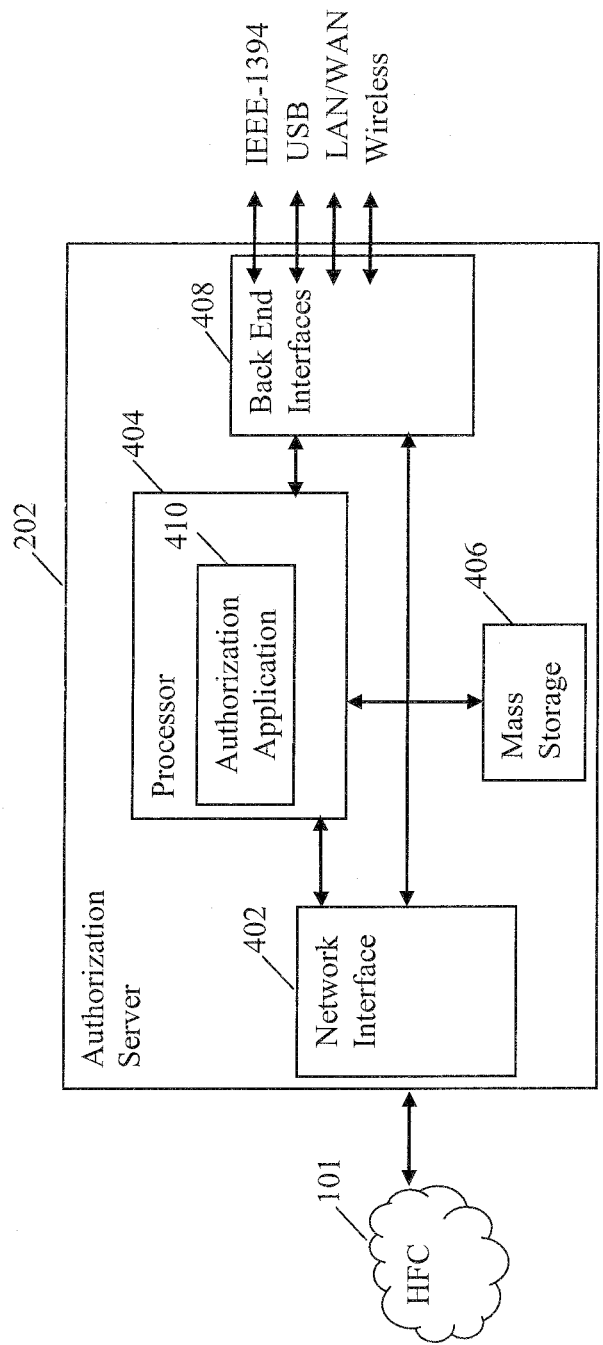
FIG. 4 is a functional block diagram of an exemplary authentication server for use with the present invention.

Referring now to FIG. 4, an exemplary embodiment of the authorization server 202 is given. In the illustrated embodiment, the authorization server (AS) 202 is disposed at the CPS 204 and generally comprises a network interface 402 for communication with the HFC network 101, a processor 404 and associated RAM 406, as well as additional interfaces 408 for communication with other headend 150 entities (including e.g., the billing system 208 and content server 206).

The processor 404 is configured to run an authorization application 410 thereon. In one aspect, the authorization application 410 comprises a computer program which, when executed, receives a request for a rights profile from a CPE 106 (or proxy device), and in response to receiving the request, gathers information and access or generate a rights profile for the CPE 106. In one embodiment, the request may include information identifying the device 106 (such as MAC address, IP address, etc.), as well as information identifying the subscriber (such as a subscriber account number, password, login, challenge answer, etc.). In another embodiment, a general purpose ID derived from the digital rights management (DRM) certificate of the device may be transmitted to the authorization application 410 from the CPE 106. Different and/or additional information may be utilized as needed by the authorization application 410.

The authorization application 410 uses the information obtained from the request to query the billing system 208 for the subscription level (and optionally other rights data) of the CPE 106. Once the authorization application (AA) 410 receives the subscription information from the billing system 208, the authorization application 410 configures the information into a rights profile. This configuration may include taking the subscription level information, and determining associated specific rights therewith. For instance, if the billing system returns that that the subscriber initiating the request has a "premium, unlimited" account status, then the AA 410 may return a "clean" rights profile; e.g., no restrictions on any content use or movement (other than those which may be imposed by the content provider, such as "copy once" or DRM).

In one embodiment, the rights profile comprises an XML or HTML file which is specific to the chosen DRM.

The authorization application 410 transmits the rights profile to the requesting CPE 106 (i.e., the rights management application 310). In one embodiment, the rights profile represents the rights of a subscriber with respect to a specific CPE 106 (whether the requesting CPE 106, or another CPE 106 in communication therewith). In other words, the rights profile may be specific to a device, and may comprise rights information which may only be used by the receiving CPE 106, as previously described herein. If the receiving CPE 106 is not the CPE 106 to which the rights profile relates, the receiving CPE 106 may store the profile, and/or transmit the profile to the appropriate CPE 106 for decoding and playback there. This may be accomplished for example by having the RMA 310 be enabled to read the rights profile for the device-specific data (e.g., MAC address), and query other devices on its network via extant protocols for its MAC address. When the matching MAC address is found, the receiving CPE transmits the profile to that device via its network interface.

Alternatively, a rights profile may represent the rights of a particular user or subscriber. According to this embodiment, the rights profile (once delivered to a first CPE 106 associated with a subscriber) may be propagated to other CPE 106 associated with that subscriber without requiring generation of a new profile. In other words, a rights profile for a particular subscriber, once generated by the authorization application 410, is stored at either the authorization server 202, the requesting CPE 106, or a storage entity associated with the authorization server 202 or the CPE 106. When a second CPE 106 requests a rights profile, information in the request indicates that the subscriber associated with the second CPE 106 is the same as the subscriber associated with the first CPE 106, and the same rights profile is provided thereto. The determination that the first and the second CPE 106 are associated with the same subscriber account may be made at either the first CPE 106 or at the authorization application 410 of the authorization server 202.

A copy of the rights profile may also be stored at the authorization server 202 or a database associated therewith (not shown) in order to provide authorization information to requesting entities. For example, a content source (e.g., web server) may receive a request for content from a CPE 106 and in response thereto, may query the authorization server 202 for the rights profile associated with the CPE 106. A determination is then made (either at the server 202 or at an entity associated with the content source) as to whether the content should be delivered to the requesting CPE 106. In one such variant, the content source is operated by a third party provider which has a relationship with the MSO to service the latter's subscribers.

It is appreciated that the authorization server 202 may comprise additional components (not shown) and functionality well known to those of ordinary skill in the cable and embedded system fields, and accordingly not described further herein. For instance, AS 202 may include a management application or interface (for control by the MSO), interfaces to other headend or network entities, RAID or failover functionality, and so forth. Moreover, the functionality of the AS 202 may be implemented entirely in software on another extant platform (e.g., an application or other server within the content delivery network).

Methodology—

Figure 5:
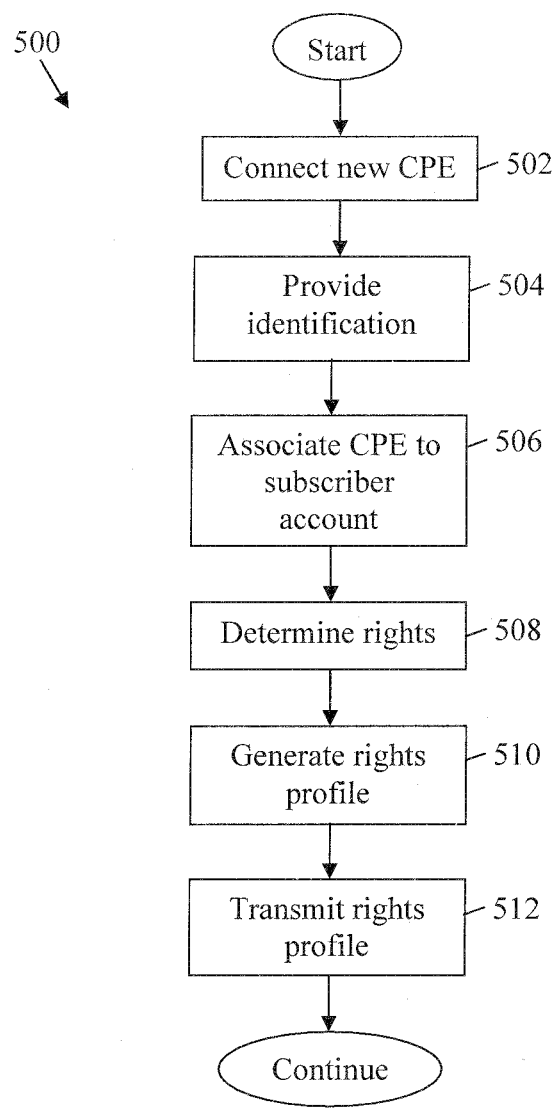
FIG. 5 is a logical flow diagram illustrating one embodiment of a method for providing a rights profile to the CPE of FIG. 3.

FIG. 5 illustrates an exemplary embodiment of the method 500 of providing a rights profile to a new CPE 106 within the rights-managed network.

As illustrated, per step 502, a new CPE 106 is connected. When the device is connected, the device is informed that it must request a rights profile from the authorization server 202. In one embodiment, the CPE 106 is purchased or leased directly from the MSO. In this instance, at the time of purchase or lease, the billing system 208 is updated, and the CPE 106 is added to the subscriber's account. When this occurs, a message is triggered to the CPE 106 that it must request a rights profile from the authorization server 204 at set-up or start-up. Alternatively, the CPE may be programmed or caused to seek its original rights profile upon installation/startup. In yet another embodiment, the device is added to a subscriber account (as discussed above) and, in response, the license server of the DRM adds it to the domain of the content that is assigned to the customer. Rights or usage information is obtained when the device accesses the content as the rights are embedded in the DRM security for each content or asset.

In another embodiment, the newly connected CPE 106 comprises a retail device not provided by the network MSO. After configuration, the newly connected CPE 106 requests content from the network (e.g., from the CPS 204 or another entity known to the CPE). In response to the request, the CPS 204 informs the CPE 106 that a rights profile is required to receive content (thereby causing it to initiate a request for the rights profile according to the previously described approach).

At step 504, the CPE 106 requests a rights profile by providing identification information to the authorization server 202 of the CPS. In one embodiment, the identification information may comprise information which uniquely identifies the device (such as MAC address, IP address, etc.), and/or which identifies a user of the device (such a subscriber account number, password, login, challenge response, etc.). For example, the user of the CPE 106 may be provided a user interface (e.g., generated by the RMA 310) enabling the user to enter log-in information (MSO user information); this log-in information may then be transmitted to the authorization server 202. Alternatively, this log-in causes a general purpose user ID to be collected from the DRM certificate associated with the CPE 106 and transmitted to the authorization server. Various other approaches useful with the invention will be recognized by those of ordinary skill given the present disclosure.

The authorization server 202 uses the identification information to direct the billing system 208 to search for the CPE 106/user, and associate the CPE 106 to a subscriber account (step 506). If the billing system is unable to locate the CPE 106 as belonging to the subscriber account listed, additional information and verification may be needed to add the device to the given subscriber account (which is entered or provided by the user at a user interface provided on the CPE 106).

Once the CPE 106 is associated with a subscriber account (step 506), at step 508, the billing system accesses information relating to the subscription level and other rights of the CPE 106 and/or subscriber and transmits this information to the authorization server 202.

Next, per step 510, the authorization server 202 uses the subscription and other rights information received from the billing system 208 to generate a rights profile. For example, the rights profile may, as noted above, comprise an XML or HTML file having data contained therein which specifies the rules for content access associated with the user/device. For instance, the rights may impose restrictions on the number of plays of a given content element (or classification of content element), restrictions on time (e.g., cannot be played after XX:YY:ZZ), the ability to copy or reproduce the content (e.g., DRM data), and so forth.

At step 512, the rights profile is then transmitted to the requesting CPE 106. The profile may be encrypted and/or digitally signed, or carry integrity protection data (e.g., a hash or residue) such that the receiving entity can generate its own has (using a common algorithm) and compare the hashes in order to determine if the file has been tampered with. As noted previously, the CPE 106 may store the profile or, if the request was made on behalf of another CPE 106, may transmit the profile to the other CPE 106.The rights profile may also be stored at the authorization server 202 (or a storage entity associated therewith) for subsequent use if desired. See, e.g., the discussion of the rights profile database provided elsewhere herein.

Figure 5A:
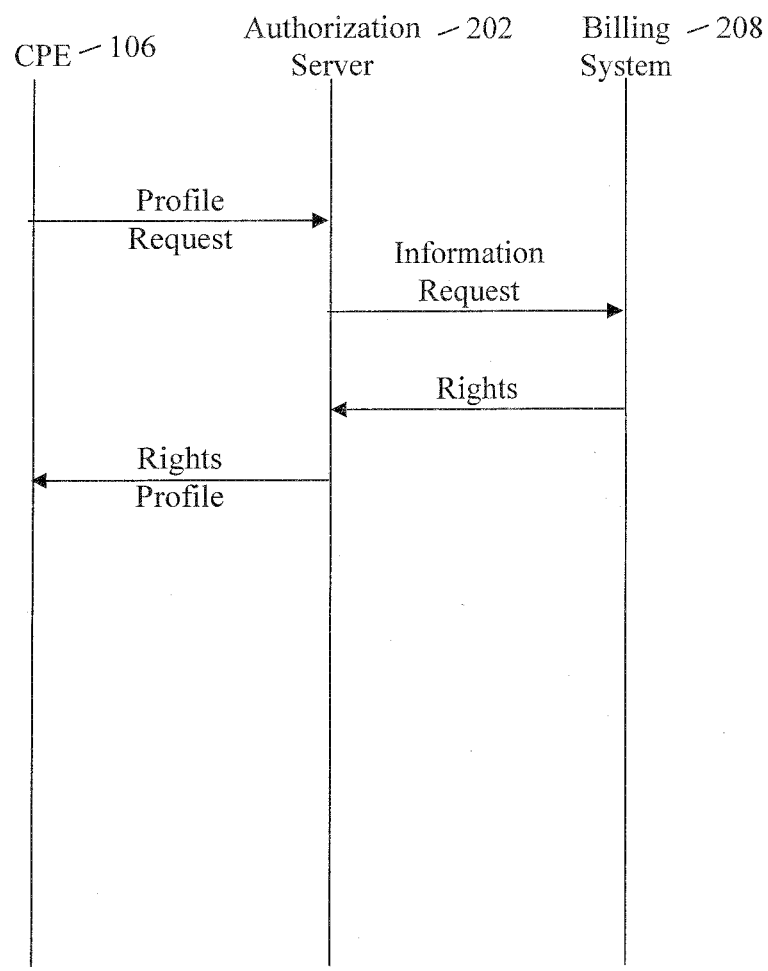
FIG. 5a is a graphical representation of communication exchange for providing a rights profile to the CPE of FIG. 3.

FIG. 5a illustrates an exemplary message exchange as between the CPE 106, authorization server 202 and billing system 208 according to the method 500 discussed above. As shown, the CPE 106 requests a profile from the authorization server 202. The request contains information identifying the CPE 106 (including e.g., MAC address or IP address) and/or the subscriber or subscriber account (including e.g., subscriber account number, password, login id, etc.), depending on whether device-based, user-based, or "hybrid" authentication is being utilized. The authorization server 202 in turn requests information (such as subscription level and other rights information) from the billing system 208. The billing system 208 returns the requested information (e.g., "Rights") which the authorization server 202 uses to generate a rights profile. The rights profile is then provided to the CPE 106.

Figure 5B:
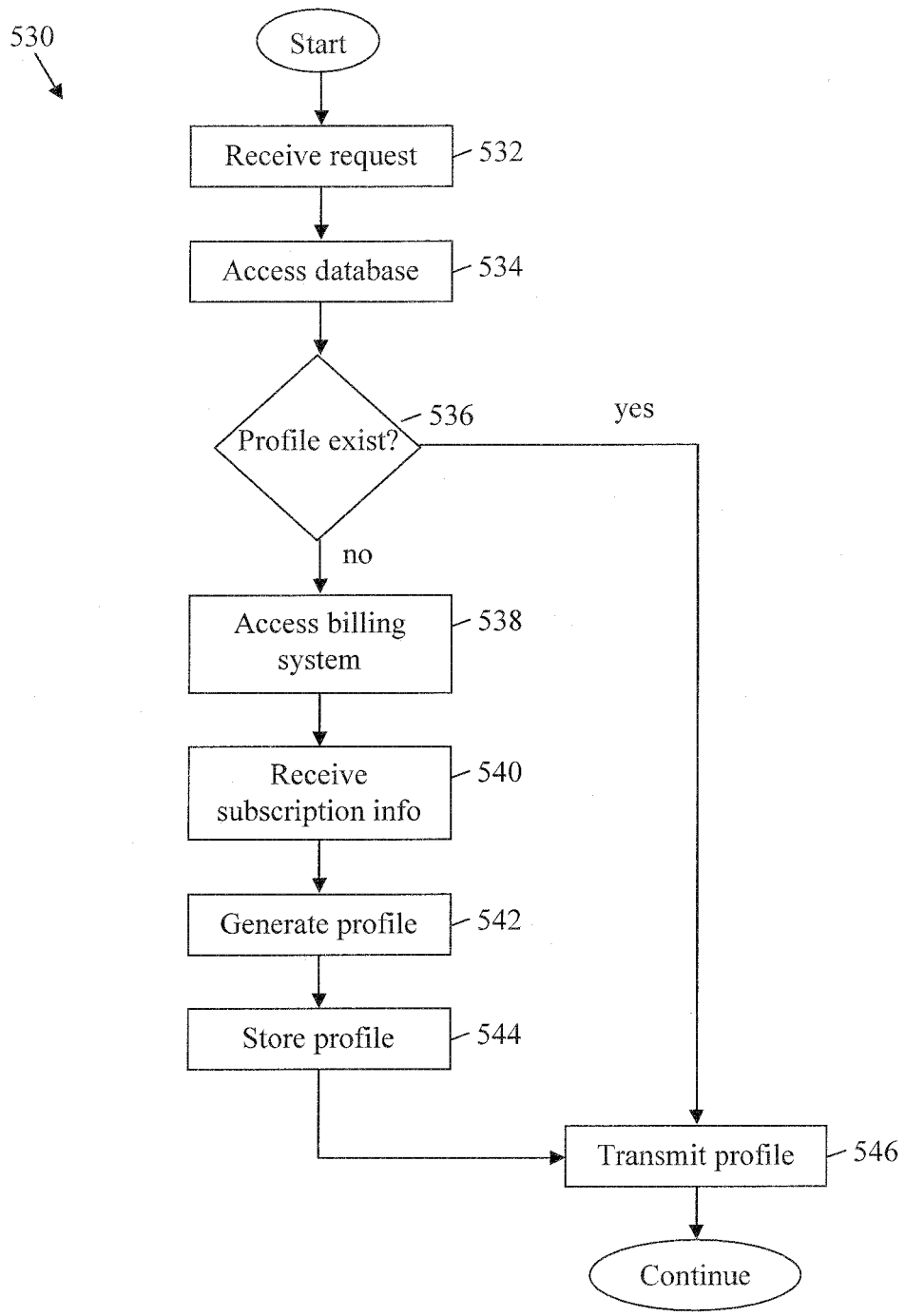
FIG. 5b is a logical flow diagram illustrating another embodiment of a method for providing a rights profile to the CPE of FIG. 3.

FIG. 5b illustrates another embodiment of the method 530 of providing a rights profile to a CPE or other requesting device, wherein the device is already known to the content delivery network (e.g., previously registered). As shown in FIG. 5b, the first step 532 comprises receiving a request for a profile or content. Depending on configuration, the requesting device may (i) use its RMA 310 to request content or a directory file, which when presented to the receiving entity, invokes a rights profile negotiation as a condition precedent to the delivery of or access to the requested content/directory; (ii) use the RMA 310 to request a rights profile directly, before any content or directory file is requested (i.e., the rights profile request and content request are effectively bifurcated).

Next, the rights profile database is accessed based on the user/device data presented with the request per step 534. If a matching entry is present (step 536), then the profile is retrieved, processed as necessary (e.g., encrypted, hashed, etc.), and transmitted to the requesting CPE 106 per step 546.

If no relevant profile exists (step 536), then the billing system is accessed per step 538, the relevant billing information received (step 540), and the profile generated (step 542). The generated profile is then stored (step 544) and transmitted to the CPE per step 546. It will be appreciated that the foregoing approach may also be used for updates of an existing profile; e.g., the AS logic can be configured to determine the "freshness" of the profile in the database, and request a periodic or event (e.g., request) driven update to make sure that the rights profile is maintained as consistent as possible with the user's account status as reflected by the billing system.

Figure 6:
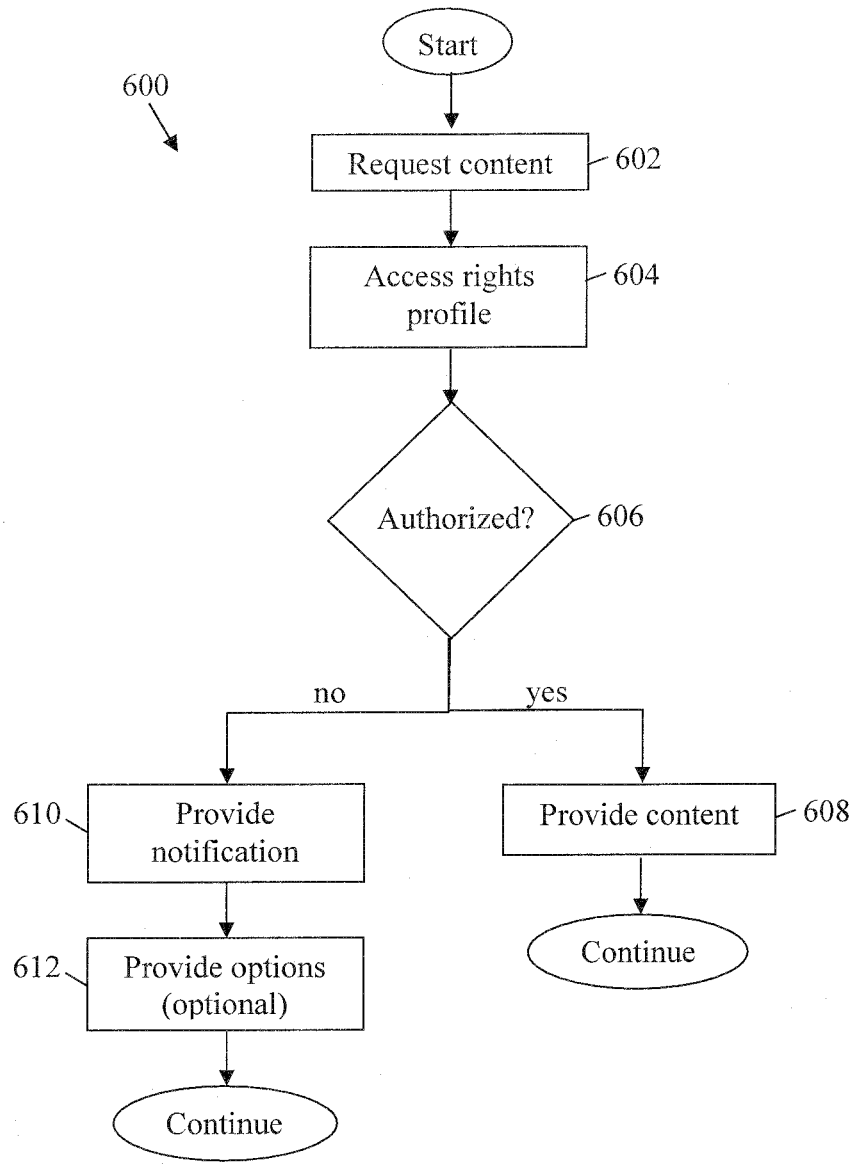
FIG. 6 is a logical flow diagram illustrating one embodiment of a method for providing content to the CPE of FIG. 3.

FIG. 6 illustrates an exemplary method 600 of providing content to the CPE 106 within the rights-managed network. While the following methodology is described primarily in the context of a user or device which has already been authenticated to the CPS and which has been given its rights profile, it will be recognized that the request for content can be intertwined or merged with the rights profile negotiation as previously described (e.g., the user may simply request the content via a U/I on the CPE 106, and initiate a seamless profile negotiation and transfer, and access of the profile to initiate decode and playback of the selected content).

As illustrated, per step 602, the CPE 106 requests content from the CPS 204. In one embodiment, the content is provided to the CPE 106 via the content server. Then, per step 604, the rights profile stored at the CPE 106 (or another device associated therewith) is accessed. From the rights profile it is determined (at step 606) whether the CPE 106 is authorized to display the content. As will be discussed below, in order to determine whether a CPE 106 is authorized, information in the rights profile is compared to metadata regarding the content.

If it is determined that the CPE 106 is authorized to display the content, then the content will be provided to a display device associated with the CPE 106. It will be noted that in certain embodiments, the CPE 106 may comprise a display device; alternatively, these may be separate devices in communication with one another.

If it is determined that the CPE 106 is not authorized to display the content, per step 610, the CPE 106 provides a notification to be displayed on the display device associated with the CPE 106. The notification may simply inform the user that he/she is not authorized to view the requested content. In one embodiment, the notification may also inform the user as to why it was determined that he/she is not authorized to view the requested content. For example, the notification may indicate that the user's subscriber level does not include the requested content, that the user's device does not support the requested content type or format/bitrate, that the user's time for accessing the content has expired, etc. as previously described herein.

Next per step 612, the user may be given options for accessing the content despite that he/she is not currently authorized to view the content. For example, the notification may include options for increasing the user's subscription level to a higher tier (e.g., a subscription level which would include access to the requested content), or for paying to receive the content at a one-time premium (e.g., pay-per-view). Alternatively, the user may be presented with a "trailer" or teaser (e.g., limited play or non full-featured version), for the requested content so as to provide incentive to buy.

Suppose for example, that the rights profile for a CPE 106 requesting access to content indicates that the subscriber is a lower-tier subscriber, and thus not entitled to certain types of content, or content from certain content sources (e.g., HD content, movie content, interactive content, content from HBO™, etc). Furthering this example, suppose that a rights profile does not authorize a user to receive e.g., any movie content from HBO™ and that metadata relating to the requested content (e.g., embedded within the content, or provided as a separate data structure) indicates that the requested content is movie content from HBO. The rights management application 310 compares the content metadata to the rights profile, and determines that the subscriber is not authorized to view the content. Accordingly, the content will not be presented to the subscriber, and instead a notice is presented to the user indicating that he/she is not entitled to the content. The notice may also offer the user an opportunity to purchase the requested movie (as a pay-per-view or on-demand content) and/or to change his/her subscription plan to a channel line-up which includes access to content presented by HBO.

In another example, the rights profile may indicate that a CPE 106 is only granted access to content for a limited amount of time, or may only playback content a certain number of times. The rights profile may specify these restrictions to be content-specific (e.g., certain content may only be accessed for a restricted time period). According to this example, if the subscriber requests access to content which has expired (e.g. after the predetermined time period has expired, or the maximum allowed number of times the content can be played back has been reached), a notice (and not the content) will be presented to the user. As above, the notice may also offer the user an opportunity to purchase the requested content.

In yet another example, the rights profile may specify the device capabilities. A CPE 106 may only be granted access to content which it is capable of playing back. For example, the rights profile may indicate that the CPE 106 is only capable of reading MPEG-2 encoded/container format content. If a user requests access to content which is delivered in MP4 container format, or the content is encoded in H.264, the CPE 106 may deny the user access to the content and present the user with a notification that he/she is not authorized to view the content. The notification may further specify a reason for the refusal (e.g., the device requesting access is not capable of playing the content). In a further embodiment, the user may be provided with options as to: (i) where a required codec can be downloaded; (ii) where a similar device capable of playing the requested content may be purchased (including leased from the MSO), and/or (iii) where a transcoded or suitable format version of the requested content can be obtained. It will be appreciated that with respect to Item (iii), the RMA 310 may also be configured if desired to automatically invoke a request to the content source (e.g., the content server) for the same content in a compatible format.

In another variant, the RMA may invoke a discovery protocol to determine the indigenous decoding/playback capabilities of the CPE on which the RMA 310 is running, such as via a configuration file access or call, if the rights profile does not contain any device configuration information. This variant is particularly useful in user-based authentication only, since the content delivery function may be by design platform-agnostic, and the network or RMA may have no indigenous knowledge of the configuration of the underlying CPE 106. For example, if an MSO subscriber goes to her friend's house and logs into the content delivery network of the MSO and downloads the media player application onto her friend's CPE, the capabilities of that CPE (e.g., DSTB, laptop, personal media device, etc.) will be unknown to the RMA just downloaded, and hence a discovery protocol must be used.

As noted above, in one example, the content server 206 and/or the CPE 106 itself may be configured to process content including de-encapsulating the content from a first media file container format and subsequently re-encapsulating the content to a second media file container format which is known to be compatible with the requesting CPE 106 and/or de-encode the content to one or more different codecs. It is appreciated that, in one embodiment, although the rights profile for a CPE 106 may indicate that the device is not capable of displaying selected content, the CPE 106 or content server may process the content as discussed so that it may be displayed.

Figure 6A:
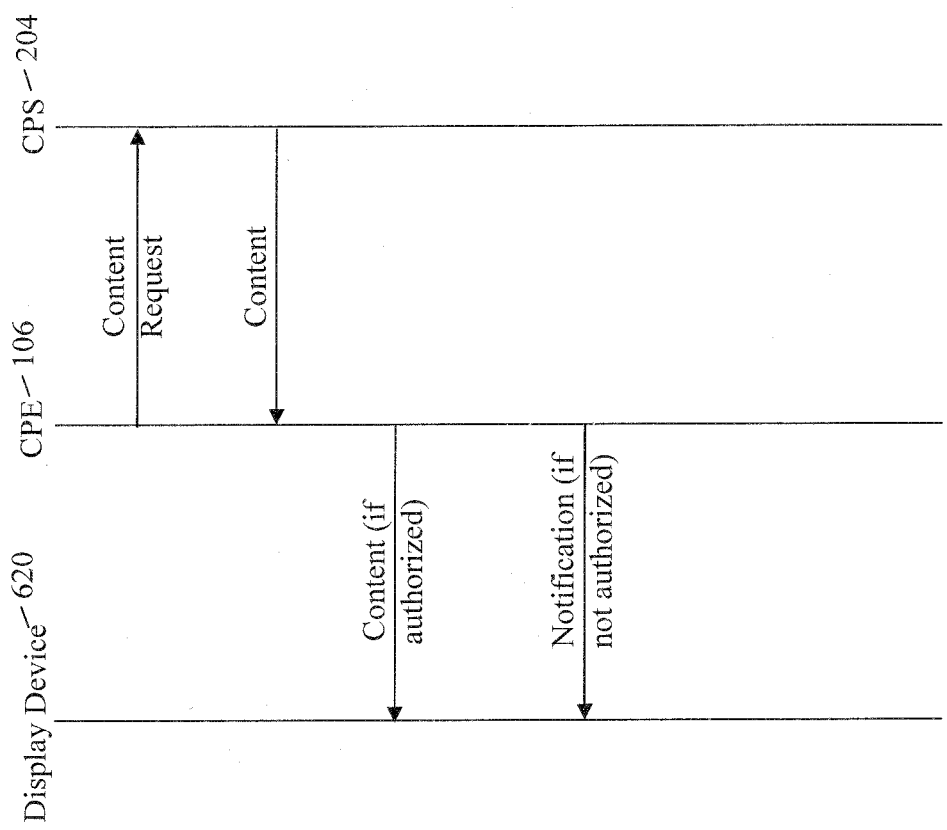
FIG. 6a is a graphical representation of communication exchange for providing content to the CPE of FIG. 3.

FIG. 6a illustrates an exemplary message exchange as between the CPE 106, a display device 620 associated with the CPE 106, and the CPS 204, according to the method 600 of FIG. 6 discussed above. As shown, the CPE 106 requests content from the CPS 204. The CPS 204 in turn provides the CPE 106 with the requested content. The CPE 106 determines, based on its rights profile, whether the content should be distributed to the display device 620 for playback. If it is determined that the requesting user is authorized to view the content (via the rights profile), then the content is provided to the display device 620. If not, the content is not provided and instead a notification is presented to the user.

It is also appreciated that the methodology of FIGS. 6 and 6a may be modified for the case where the content is already resident on the CPE (or a device accessible thereto in the premises network), and hence no delivery of content or request therefor is required. In such a case, the encoded content file is accessed by the RMA 310, and upon attempting playback, the RMA invokes the aforementioned procedure for accessing the rights profile (step 604), determining authorization (step 606), and decoding the content for playback. Moreover, as previously noted, the rights profile may not be resident on the same CPE 106 as the RMA 310, in which case the aforementioned methodology is modified to cause the RMA to request the profile (or at least the information contained therein) from the device storing the profile. In one variant, a rights profile request message (RPRM) is generated and sent by the RMA 310 via an interface (e.g., wired or wireless interface) between the two devices. The receiving device (profile "server") receives the RPRM, determines the authenticity of the requesting device (CPE) and its right to access the profile, and when completed, formats a response message containing the relevant portions of the profile, which is sent to the CPE (and the RMA 310) so that access to the content can be determined.

Upgrades and Revocation—

In another aspect of the present invention, the rights profile provided to the CPE 106 may have a limited utility; e.g., an expiration date, finite number of accesses, etc. When the expiration criteria are met; e.g., expiration date, the CPE 106 must request a new rights profile according to the methods discussed above. Accordingly, if the user's rights are revoked (such as for failure to pay subscription fees), the updated rights profile will reflect that the user is no longer entitled to access content. Further, if the user upgrades his or her account, these changes will also be reflected in the updated rights profile. This functionality is necessary in cases where the profile is delivered to a client device which may be routinely detached or out of communication with the MSO's content delivery network (and hence the CPS/AS of FIG. 2). If the subscriber's rights or status changes, such a device will have no way of knowing it, and may continue to utilize an invalid rights profile potentially ad infinitum.

In one variant, the rights profile is encoded with data that causes it to simply expire after a prescribed period of time, or number of accesses or executions of the profile file itself After that, the profile is inoperable/inaccessible, and hence cannot be used to gain access to any encoded content until it is refreshed by the CPS/AS.

In another variant, the profile alerts the user with on-screen messages or audible cues that the profile is reaching expiration, and instigates the user to re-establish connection with the MSO host network to be refreshed. In yet another variant, the functionality of the media player is degraded or reduced by the RMA such that the user's experience with the content is less than optimal, thereby causing them to refresh their profile. This degradation may include for example: (i) reduction of video rendering quality (e.g., no HD, only SD, or pixelation); (ii) loss of features (e.g., no "trick mode" commands such as FF, REW, PAUSE, etc.); (iii) loss of the audio portion; and/or (iv) imposition of a visible watermark or other artifact on the display, thereby substantially interfering with the user's experience.

Unrequested rights profiles may be provided to CPE 106, such as in instances when the MSO would like to implement rights changes immediately. For example, rather than waiting for a current profile to expire, an updated rights profile may be provided as soon as changes to a subscriber's rights are made (e.g., upgrades and/or revocations). The new or updated profile is pushed to the CPE over the available transport, and if no transport is available (e.g., the CPE 106 is not in communication with the network), then the profile is buffered or queued for later transmission when a transport becomes available.

In another embodiment, the present invention may be utilized in conjunction with the methods and apparatus discussed in co-owned, co-pending U.S. patent application Ser. No. 12/631,713 filed on Dec. 4, 2009 and entitled "APPARATUS AND METHODS FOR MONITORING AND OPTIMIZING DELIVERY OF CONTENT IN A NETWORK", incorporated herein by reference in its entirety. As discussed therein, the system may be configured to recommend an alternative delivery platform available to the user so as to ensure optimized content delivery to multiple user devices. In other words, the user (e.g., a subscriber of an IP, cable or satellite network) is provided with the best possible "user experience" at all times, depending on the various hardware/software environments they have available to them, and their current usage needs and preferences. For example, in one embodiment, an optimization and monitoring entity (OME) is utilized in conjunction with other network and user premises components to provide the aforementioned functionality. The OME comprises one or more software applications which work in conjunction with one another (and with one or more content servers) to determine, evaluate, and provide notification to a user of one or more alternative content delivery platforms, such as for example when a request for content is received. Alternative services, transports, and delivery models, may also be recommended in another variant of the invention.

In one exemplary use case, requests for content are received at a content server (such as from a device which may or may not run the herein described media player application), and forwarded to the OME. The content server may satisfy the request, or may first require selection of a delivery platform. Information identifying the requesting device (such as IP address, MAC address, etc.) and/or the subscriber account or specific user (such as account number, physical address, login/password information, etc.) is derived from or embedded in the content requests (or otherwise retrieved from information contained within the request). The OME uses the collected information to determine whether the requesting device is registered to a known user account by comparing the identification to a database of registered accounts and devices. The OME uses the aforementioned database to compile a list of all of the other known client devices in a specific user's account. Software applications running on the OME further differentiate the various features and capabilities of the different types of client devices registered to a user account and which may be used to receive content. In one variant, the OME comprises a "recommendation engine" that determines whether requested content may be provided to the same user on a different platform; e.g., on a different one of the client devices associated with the user's account (including e.g., a device which may or may not run the herein described media player application). Such an alternative device may be recommended based on e.g., video/audio quality, picture size, bandwidth availability, and/or any other additional capabilities of the recommended client device, or may be recommended based on historical usage or other information about the user (or a specification of user preferences associated with the account and accessed by the OME).

Fraud Prevention—

In another aspect of the invention, the rights profile and decoding algorithm used by the RMA/media player application are cryptographically protected from unauthorized access or modification (confidentiality and integrity protection) using: (i) encryption; and (ii) a cryptographic hash of the type well known in the art, respectively. The encryption may be for example according to an RSA public/private key pair, and the hashing according to a one-way hash (e.g., Merkle-Damgard construction such as SHA-1 and MD-5). The public key of the pair is used to encrypt the profile, and the private key is used by the RMA/media player to decrypt the profile and access it. As noted above, the private encryption key and/or hashing functions can be maintained within a secure microprocessor (SM) of the client device on which the RMA/media player is running, thereby preventing access to this information.

Moreover, the RMA can be configured to store the decrypted profile in secure storage as well, so as to prevent copying or transfer thereof to another device in an unencrypted form. Moreover, the content (e.g., media) can be encrypted using the same or a similar function, so as to provide confidentiality and integrity protection, and prevent surreptitious copying. This encryption may be the "encoding" previously referenced herein, or may be yet an additional layer of protection in addition to the encoding (the latter which may be as simple as requiring a proper input or seed to a known decoding algorithm, or more complex such as through use of a secret decoding algorithm/seed). For instance, in one variant, the encrypted rights profile may carry the seed needed to seed the media player's decoding algorithm to decode the content. This seed may be content-element specific (e.g., each content element may be encoded with a different seed, thereby requiring provision of the same seed to the media player to decode). Alternatively, the seed can be generic; i.e., the same seed is used to encode different content elements. Moreover, the seed can have a finite lifetime, such that content elements that are downloaded from the network are encoded using a different seed for each successive time period, thereby frustrating decoding of newly downloaded content elements using an old seed. For example, in one variant of the invention, all content accessible by the media player/RMA must be downloaded contemporaneously with the content access request, and the content is encoded on a rolling or finite time basis, such that the seed provided with the rights profile (when decrypted) is only good for a given period of time. If the user requests the same content say a day later, the downloaded content would be encoded using a different seed, thereby frustrating decoding unless the user (RMA) also procures a refreshed or updated rights profile.

The use of a dual-layer encoding and encryption scheme in some embodiments of the invention provides benefits from the standpoint of faster/easier decoding; the encoding is more of a user access control mechanism (i.e., is intended to limit access, but not necessarily provide a high level of "hacking" protection). The RSA or similar encryption on the other hand, acts as a protective wrapper for the content while in transit, and is significantly more difficult to penetrate. Hence, in one embodiment, the content is decrypted once upon receipt, and stored in encoded (but decrypted) form, so that the relatively simple decoding can be performed rapidly and without having to decrypt also on each play by the user.

Software Architecture—

Figure 7:
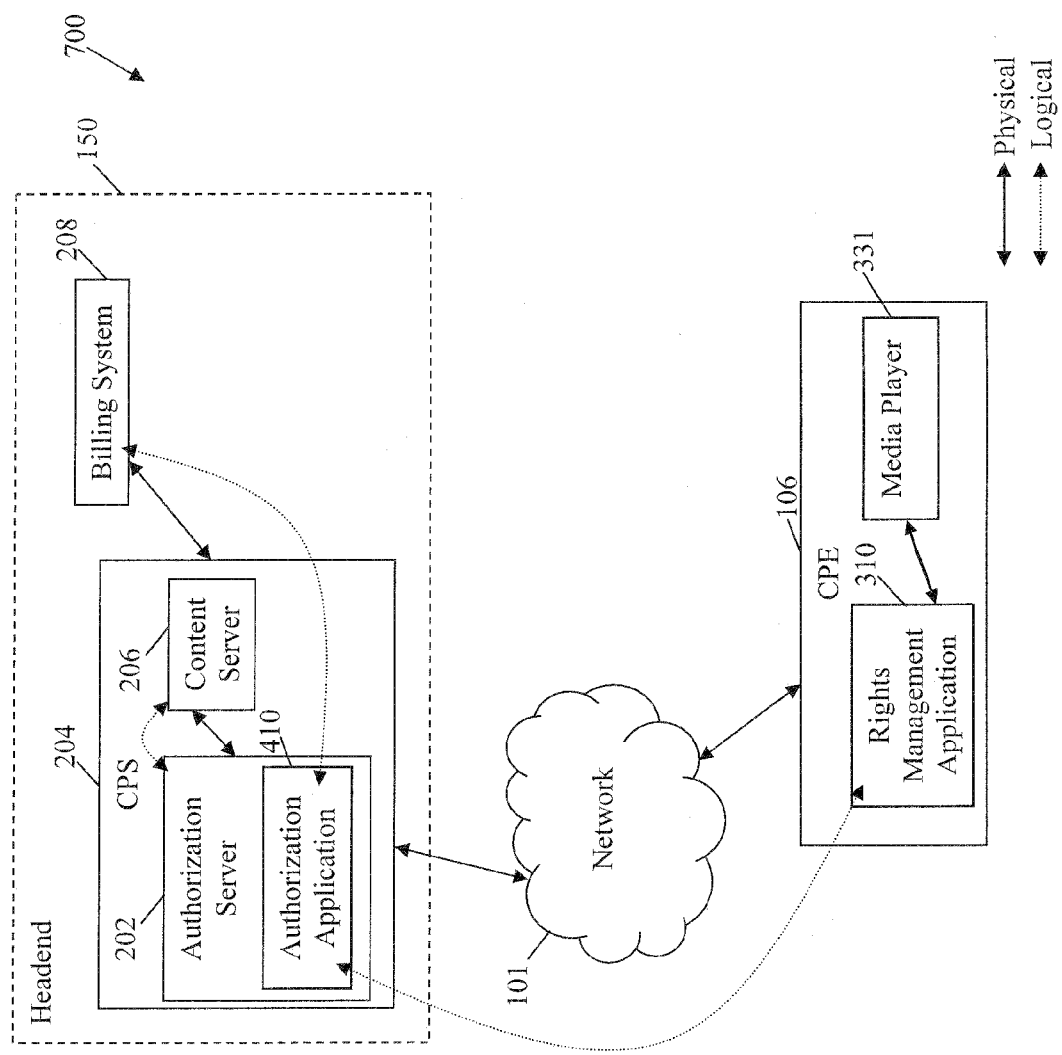
FIG. 7 is a functional block diagram of a software architecture for use in the rights-managed network of the present invention.

FIG. 7 illustrates one exemplary embodiment of a software architecture of the CPE 106 and other communicating entities within the network. As shown in FIG. 5, the architecture 700 comprises an authorization application 410, which may be disposed for example on an authorization server (as shown in FIGS. 2 and 2*a*), or another network agent if desired. By disposing the authorization application 410 at the headend or BSA hub, the server process can advantageously provide rights profiles to multiple CPEs 106 simultaneously.

A corresponding rights management application 310 is disposed on each CPE 106; this application allows the CPE 106 to receive/send information from/to the authorization application 410, for e.g., requests for rights profile and the rights profile themselves. As previously noted, the CPE also includes a media player application (MPA) 331, which may be a stand-alone application, or integrated with the RMA 310 as desired.

The authorization application 410 is in logical communication with applications (not shown) running at the billing system 208 to receive rights information regarding specific CPE 106 and/or subscribers. Accordingly, the authorization application 410 facilitates sending a request for information from the billing system 208 when a CPE 106 has requested a rights profile. The authorization application 410, as indicated above, accesses or generates a rights profile from information received from one or more applications running at the billing system 208. The rights profile is then communicated (via the authorization application 410) to the CPE 106.

The authorization application 410 is also in logical communication with applications (not shown) running on the content server 206 to pass rights information thereto. In other words, the authorization application 410 may, when a request for content is received at the content server 206, provide that server with information as to whether the requesting CPE 106 should be granted access to the content. In another embodiment, this step is obviated in favor of having the CPE 106 itself determine whether content may be provided to a user, (discussed above with respect to FIG. 6).

It is further appreciated that the rights management application 310 running on the CPE 106 may also be in logical communication with other processes within the premises, such as for example user interface processes, display device processes, and processes running on other devices, such as a wireless device coupled to the CPE 106 via the wireless interface, or other CPE 106.

Transferrable Rights Profile—

In another embodiment, the rights profile may be made moveable between several CPE 106. For example, a first CPE 106 may be configured to request a rights profile (as discussed above); the rights profile is then stored on a removable storage device, such as a USB key, a subscriber identity module (SIM) card, smart card, flash memory card, etc. The removable storage device having the rights profile stored thereon may then be removed from the first CPE and inserted into a second CPE 106. The rights profile may contain information which identifies the subscriber thereby allowing the second CPE 106 to request access to content (as discussed above). The second CPE 106 reads the rights profile and provides content to a user based at least in part thereon. In one variant, to prevent fraud, the user may first be required to establish a log-in profile (e.g., login name and password) in order to enable the first or second CPE 106 to access the rights profile stored on the storage device. A separate (or the same) log-in may also be required in order to enable the user to access content from the first or second CPE 106 as well.

CPS On-Premises Proxy—

Figure 8:
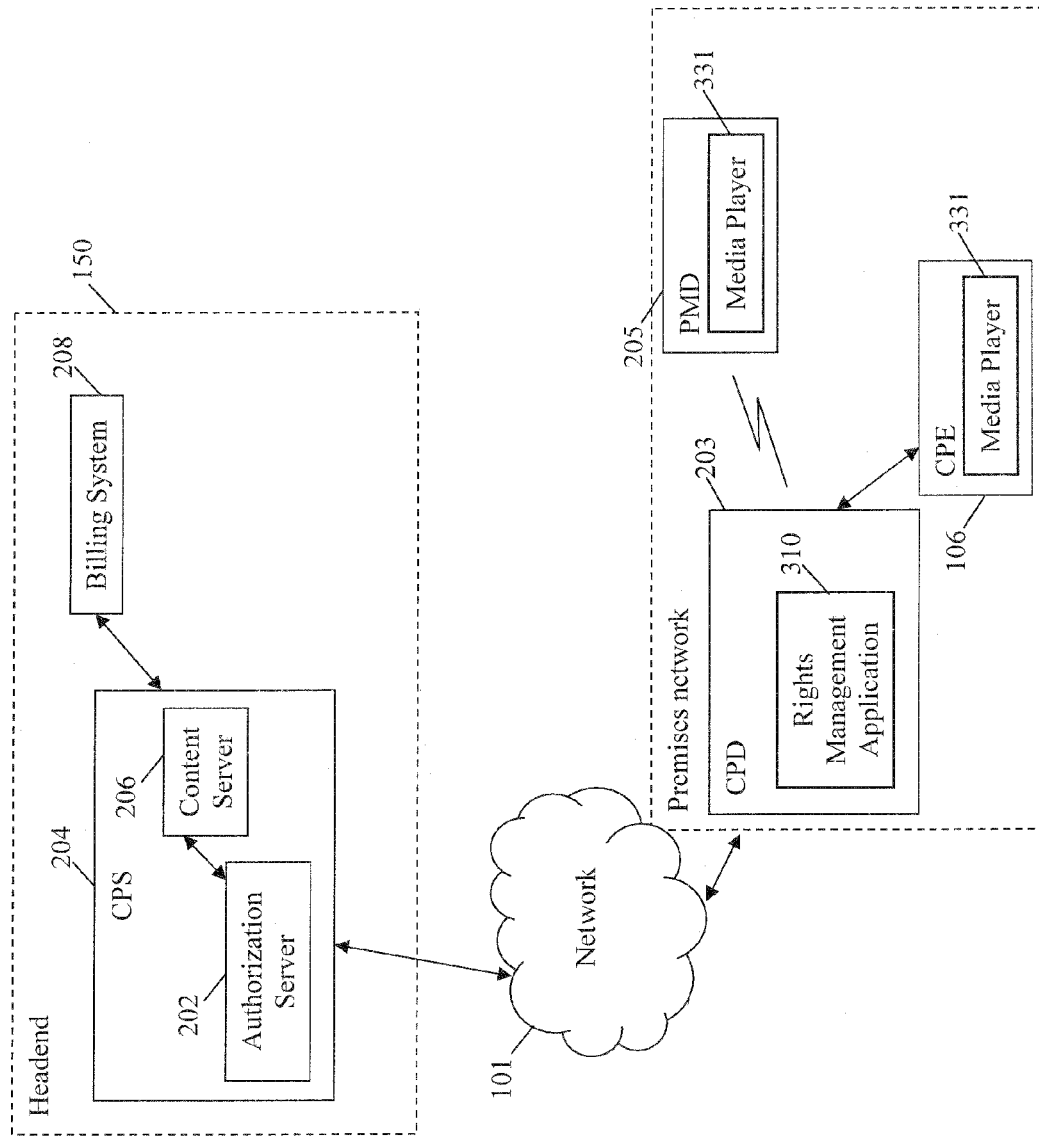
FIG. 8 is a functional block diagram of one embodiment of an on-premises content provisioning system (CPS) architecture according to the invention.

In another embodiment of the invention (illustrated in FIG. 8), at least a portion of the CPS 204 functions performed at the headend or other network-side entity can be placed within the subscriber's premises, such as via use of a media gateway or converged premises device (CPD). This CPS premises "proxy" can act to process user or device login/authentication and rights profile or content requests with minimal or no interaction with the headend (parent) CPS. In one variant, the gateway or CPD is equipped with a physically secure microprocessor (SM) and storage area which holds the rights profiles for the various users associated with that premises, along with any cryptographic information necessary to implement decoding or transfer of the profile or content. For instance, in one configuration, the RMA comprises a server portion and a client portion (the latter which contains the media player application 331). The server portion is disposed on the CPD or gateway, and sits "in front" of the local DVR or other storage device so as to control access to content stored on the DVR in encoded form. The DVR might for example have a partition on its HDD or mass storage device where encoded mature content (suitable for adults only) is stored in encoded form. The RMA server portion receives a request from the client (media player) situated on say a PC or mobile device within the premises. The client MP acts much as in other embodiments described herein, yet with the exception that the RMA server portion must be contacted and "logged into" in order to authenticate the device and/or user (depending on which form of access is used).

Hence, in one use case, the user starts the media player application (MPA), and enters their login information on the displayed UI on the client device. The MPA generates a request message to the RMA server process and transmits it over an available or designated transport (e.g., MoCA network or WLAN). The RMA server portion receives the request, and accesses the authentication database to determine if that user/device is on a "white list" of authorized users/devices (and if so, whether the login information is valid). If so, the RMA then accesses the user's rights profile to determine if the user/device has access to the partition. If so, the RMA grants access to the DVR directory function for the partition (even the titles of the content may be too explicit for younger viewers), and transmits the directory data to the MPA on the client. The user then views the directory function, selects content from the partition, and transmits this content request to the RAM server. The RMA server then transmits the encoded content to the MPA on the client device, which then decodes the encoded content using security information (e.g., access code, decryption key, etc.) either resident on the client or otherwise provided to the client after successful authentication and rights validation.

The RMA server portion may also be placed in contact with the CPS, the latter which periodically or situationally provisions or updates the RMA server at the premises to reflect current rights profiles for the users/devices of the premises.

The foregoing example architecture represents but one of many such configurations enabled by the present invention. For example, the rights profile may be alternatively transferred to the client device with MPA, and the MPA can determine access rights to content that is freely provided (in encoded form) by the DVR/RMA server after user/device authentication.

Business/Operational Rules Engine—

In another aspect of the invention, the processor 404 entity (e.g., rendered as one or more computer programs disposed on a headend server or entity (e.g., authorization server 202, content server 206, BSA hub entity, CPE 106, or other location) includes a so-called "rules" engine. This engine comprises, in an exemplary embodiment, one or more software routines adapted to control the operation of the CPS and/or CPE 106 in order to achieve one or more goals relating to operations or business (e.g., profit). Included within these areas are network optimization and reliability goals, increased maintenance intervals, increased subscriber or user satisfaction, increased subscription base, higher profit (e.g., from increased advertising revenues, more subscriber "views" of given content, higher data download speed, increased bandwidth and responsiveness to changing demands for bandwidth, reduction of undue QAM replication, and so forth.

These rules may comprise a separate entity or process, and may also be fully integrated within other processing entities (such as the aforementioned authorization application (AA) or the rights management application 310), and controlled via e.g., a GUI displayed on a device connected to the relevant CPE or server. In effect, the rules engine comprises a supervisory entity which monitors and selectively controls the CPS and/or CPE 106 operation processes at a higher level, so as to implement desired operational or business rules. The rules engine can be considered an overlay of sorts to the more fundamental algorithms used to accomplish required network operation, such as IP address assignment, statistical multiplexing, BSA switching, and so forth.

For example, the authorization server 202 or CPE 106 may invoke certain operational protocols or decision processes based on information or requests received from the CPE 106, conditions existing within the network, demographic data, geographic data, etc. However, these processes may not always be compatible with higher level business or operational goals, such as maximizing profit or system reliability. Hence, when imposed, the business/operational rules can be used to dynamically (or manually) control the operation of the client process on the CPS and/or CPE 106. The rules may be, e.g., operational or business-oriented in nature, and may also be applied selectively in terms of time of day, duration, specific local areas, or even at the individual user level (e.g., via specific identification of the CPE or client device via TUNER_ID, MAC address, or the like, or via user-based login as previously described).

For example, one rule implemented by the rules engine may comprise only providing certain types or formats of programming to certain subscribers or classes of subscribers. As noted previously, these rules may be implemented at the device level (e.g., CPE 106) or at the authorization server 202 (such as by placing information regarding these rules into the rights profile). The CPE 106 may possess high definition (HD) decoding capability, for example, but programs rendered in HD would not be made available to such subscribers unless they met certain criteria (e.g., "premium" subscription, etc.). Similarly, if the subscriber did not possess a required codec, CA keys, or network interface, the download of this missing component could be controlled to only subscribers meeting certain criteria. In one embodiment, the rights profile provided to the CPE 106 (and generated at the authorization server 202) may specify these criteria. In another embodiment, the business rules engine running on a processor 304 of the CPE 106 itself implements these criteria.

Another rule might impose a moratorium or restrictions on upstream data or information messages (e.g., SSP) or requests for content or a rights profile from the CPE 106 during conditions of very heavy loading (e.g., until a certain minimum threshold of available bandwidth is present), thereby avoiding contention for bandwidth resources with "premium" services. Similarly, program-related or other processing typically done upstream of the CPE 106 could be dynamically shifted to the CPE 106 under such circumstances so as distribute the processing load (and hence upstream messaging bandwidth consumed) to the CPE 106.

Yet another rule might impose restrictions on establishing or allocating new physical channels/QAMs to download content to the user. For instance, where in in-band or DOCSIS QAM is used as the transport for the requested content, instantiation, tear-down, and management of this process can be governed by the rules engine so as to mitigate resource contention, provide the desired level of user service (i.e., avoid excessive delays), etc.

Business Models—

The present invention also lends itself to various business models in terms of distribution, operation, and service provision. Specifically, by having remote monitoring, configuration and provisioning capability via the RMA 310, the service provider (e.g., MSO) is given greater flexibility in, inter alia, (i) troubleshooting and repairing faults within the CPE 106 or other connected premises devices which may otherwise require a service visit; and (ii) changing or reconfiguring a given subscriber's service package or capabilities remotely, again obviating a service visit or actions by the subscriber. For example, as previously described, a rights profile associated with a CPE 106 may be updated and changed (including providing no rights to content), then provided to the CPE 106, thereby allowing the MSO to rapidly switch service options on a per-subscriber or per-device basis. New versions or upgrades of software/firmware can readily be downloaded and installed as well. UPnP or other server processes on the CPE 106 can be configured using the remote provisioning capability also.

In another business model, the aforementioned media player application 331 is provided free of charge to MSO subscribers (e.g., with leased CPE at time of installation, or via a free website download) so that it can be installed on the various CPE/client devices associated with the subscriber (including their portable personal media devices or PMDs). The PMD may for example contain a WLAN (e.g., Wi-Fi) or 1394/USB interface that permits communication with a CPD at the subscriber's premises, the latter including a DOCSIS cable modem or other transport that enables communication with the content delivery network (and hence CPS 204). The CPS or a designated proxy server can, upon request from the PMD (via the CPD, and its IP or MAC address), determine that the request is coming from a valid subscriber device, and the media player can then be downloaded to the CPD and passed to the requesting PMD via the interface. The media player application download itself may be encrypted or otherwise protected so as to permit only the appropriate PMD (i.e., one having the private portion of the public/private key pair) to decrypt and install the file.

Alternatively, the media player application may be distributed according to an "open" model, wherein it is freely available to MSO subscribers and non-subscribers. For example, the media player might include ancillary functions which are accessible to both subscribers and non-subscribers, with the log-on to the CPS 204 and rights profile/content access functions being only available to subscribers. In one such variant, the media player can operate to decode files of a given format (e.g., H.264 encoded) that are not MSO-originated or "protected" (e.g., a video found on the web) without log-in or device authentication by the MSO network. The MSO may even provide a publicly accessible portal or website for this reason, so as to entice potential subscribers into taking a subscription (or at least "test driving" the fully-functioned media player for a period of time or number of plays).

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A non-transitory computer readable medium comprising at least one computer program, said computer program comprising a plurality of computer readable instructions which are configured to, when executed on a host device:
    access a rights profile associated with a network-based account of a user, said rights profile being encrypted using a public key of a public/private key pair and said host device comprising said private key configured to enable said program to decrypt said rights profile, said rights profile comprising at least a number of times content may be accessed or outputted to a display device;
    determine, based at least in part on said rights profile, use rights that said user has with respect to a first content element;
    access, based at least in part on said use rights, said first content element for playback to said user of said host device;
    transfer said rights profile to a second host device, said second host device associated with said user;
    enable playback of said first content element at said second device based at least in part on said transferred rights profile; and
    display a list of recommended content, the list of recommended content generated by a network recommendation process and based at least in part on data associated with the network-based account and relating to at least one of: (i) user-specific content preference data, and/or (ii) data relating to historical content selection activity, the list further being generated substantially irrespective of a device being used to access content for playback.

2. The computer readable medium of claim 1, wherein said medium is part of a mass storage device of said host device.

3. The computer readable medium of claim 2, wherein said mass storage device of said host device comprises a program memory.

4. The computer readable medium of claim 1, wherein said plurality of computer readable instructions are further configured to access said rights profile via:
    generation of a request for said profile;
    transmission of said request to a network entity; and
    receipt, from said network entity or its proxy, of said profile.

5. The computer readable medium of claim 1, wherein said plurality of computer readable instructions are further configured to access said first content element utilization of decoding data provided in said rights profile to decode said first content element.

6. The computer readable medium of claim 1, wherein said rights profile is generated by a network operator based at least in part on a subscription of said user to a service provided by said operator.

7. The computer readable medium of claim 1, wherein said plurality of computer readable instructions are further configured to generate a user interface, said user interface configured to allow a user of a content delivery network to log into a network server so that said rights profile can be provided to said host device.

8. Consumer premises equipment (CPE) for use in a content delivery network, comprising:
    a network interface configured to:
        transmit a request for information regarding a subscriber's rights to content;
        receive said information;
        transmit a request for content; and
        receive said requested content;
    a storage apparatus configured to store said information; and
    a digital processor configured to:
        generate a user interface, said user interface configured to enable said subscriber to log into a network server, transmit said request for said information, and receive said information;
        determine, based at least in part on said information, whether said subscriber has a right to access said requested content, and when said subscriber has said right, enable playback of said requested content to said subscriber; and
        present the subscriber with a list of recommended content elements, the list generated by a network recommendation process based at least on data associated with an account of the subscriber and irrespective of a device being used to access said requested content, wherein the data comprises one or more of: (i) user-specific content preference data, and/or (ii) user-specific data relating to historical content selection activity.

9. The CPE of claim 8, wherein said subscriber receives said requested content at a display device remote from said CPE, said display device and said CPE being in communication with one another.

10. The CPE of claim 9, wherein said communication comprises wireless communication.

11. The CPE of claim 8, wherein when it is determined that said subscriber does not have said right to access said requested content, said network interface further configured to provide a notification to said subscriber, said notification configured to inform said subscriber that access to said requested content is not authorized.

12. The CPE of claim 11, wherein said notification is further configured to inform said subscriber of one or more methods to obtain said right to access said requested content.

13. The CPE of claim 8, wherein said storage apparatus comprises a removable storage apparatus, said storage apparatus configured to provide access to said information to a plurality of devices via a communication of said storage apparatus therewith.

14. A first client device for use in a content delivery network, comprising:
 a radio frequency (RF) front end interface;
 a plurality of back end interfaces;
 a storage apparatus; and
 a digital processor, said digital processor configured to run at least one computer program thereon, said program comprising a plurality of instructions which when executed:
  request on behalf of a second client device a rights profile, said rights profile comprising information regarding a subscriber's rights to access a plurality of programming content on said second client device and information regarding a length of time said subscriber may be granted access to individual ones of said plurality of programming content;
  store said rights profile on behalf of said second client device at said storage apparatus;
  receive a request from said second client device for at least one of said plurality of programming content;
  determine based at least in part on said rights profile whether said subscriber is given a right to access said requested one of said plurality of programming content;
  upon determination that said subscriber has said right, enable said second device to provide said subscriber with access to said requested one of said plurality of programming content; and
  enable display of a list of recommended content on the second client device, the list of recommended content generated by a recommendation engine irrespective of which of said first or second client devices is to access the requested of the plurality of programming content, and based at least in part on one or more of: (i) content preference data associated with an account of the subscriber, and/or (ii) data relating to historical content selection activity associated with the account.

15. The first client device of claim 14, wherein said subscriber is provided access to said requested one of said plurality of programming content via a computer program executed by said second device which causes a display of said requested one of said plurality of programming content on a display device associated with said second device.

16. The first client device of claim 14, wherein the first client device is further configured to enable the second client device to provide said subscriber with one or more options to obtain said right, said one or more options to obtain said right comprising at least one of:
 purchase of limited access to said requested one of said plurality of programming content;
 purchase of access to a type of content, said type of content comprising said requested one of said plurality of programming content; and
 purchase of access to a content source, said content source being associated with said requested one of said plurality of programming content.

17. The first client device of claim 14, wherein said rights profile further comprises information regarding at least one of:
 a number of times said subscriber may have individual ones of said plurality of programming content outputted to a display device;
 one or more types of content of said plurality of programming content said subscriber may access; and
 one or more content sources of said plurality of programming content said subscriber may access.

* * * * *